US012406627B2

(12) United States Patent
Kim et al.

(10) Patent No.: US 12,406,627 B2
(45) Date of Patent: Sep. 2, 2025

(54) DISPLAY DEVICE AND PIXEL OF A DISPLAY DEVICE

(71) Applicant: Samsung Display Co., Ltd., Yongin-Si (KR)

(72) Inventors: Jihye Kim, Hwaseong-si (KR); Yu-Chol Kim, Jeonju-si (KR); Seongoh Yeom, Asan-si (KR); Jakyoung Jin, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/882,763

(22) Filed: Sep. 12, 2024

(65) Prior Publication Data

US 2025/0006129 A1 Jan. 2, 2025

Related U.S. Application Data

(63) Continuation of application No. 18/376,760, filed on Oct. 4, 2023, now Pat. No. 12,094,415, which is a continuation of application No. 17/985,550, filed on Nov. 11, 2022, now Pat. No. 11,817,056.

(30) Foreign Application Priority Data

Dec. 30, 2021 (KR) ........................ 10-2021-0192301

(51) Int. Cl.

| | |
|---|---|
| ***G09G 3/3233*** | (2016.01) |
| ***G09G 3/3266*** | (2016.01) |
| ***G09G 3/3275*** | (2016.01) |

(52) U.S. Cl.

CPC ......... *G09G 3/3233* (2013.01); *G09G 3/3266* (2013.01); *G09G 3/3275* (2013.01); *G09G 2300/0819* (2013.01); *G09G 2300/0852* (2013.01); *G09G 2310/08* (2013.01); *G09G 2320/0233* (2013.01); *G09G 2320/043* (2013.01)

(58) Field of Classification Search

None

See application file for complete search history.

(56) References Cited

U.S. PATENT DOCUMENTS

| | | | | |
|---|---|---|---|---|
| 11,263,976 | B2 | 3/2022 | Yang et al. | |
| 2020/0168160 | A1 | 5/2020 | Oh et al. | |
| 2021/0248961 | A1* | 8/2021 | Yang | G09G 3/3266 |
| 2021/0319755 | A1* | 10/2021 | Kim | G09G 3/3233 |

FOREIGN PATENT DOCUMENTS

| | | | |
|---|---|---|---|
| KR | 10-2019-0034729 | A | 4/2019 |
| KR | 10-2019-0128018 | A | 11/2019 |
| KR | 10-2021-0011554 | A | 2/2021 |
| KR | 10-2021-0055146 | A | 5/2021 |
| KR | 10-2021-0088045 | A | 7/2021 |

* cited by examiner

*Primary Examiner* — Christopher J Kohlman

(74) *Attorney, Agent, or Firm* — Innovation Counsel LLP

(57) ABSTRACT

A display device comprises a display panel including a pixel, and a panel driver configured to receive input image data in a variable frame frequency in order to drive the display panel based on the input image data. A frame period for the display panel is divided into at least one scan period and at least one or more hold periods, and a time during which the pixel performs an anode initialization operation in each of the hold periods is longer than a time during which the pixel performs the anode initialization operation in the scan period.

15 Claims, 28 Drawing Sheets

DISPLAY DEVICE AND PIXEL OF A DISPLAY DEVICE

CROSS-REFERENCE TO RELATED APPLICATION(S)

This application is a continuation application of U.S. patent application Ser. No. 18/376,760 filed on Oct. 4, 2023, which is a continuation application of U.S. patent application Ser. No. 17/985,550 filed on Nov. 11, 2022 (now U.S. Pat. No. 11,817,056), claims priority under 35 USC § 119 to Korean Patent Application No. 10-2021-0192301, filed on Dec. 30, 2021 in the Korean Intellectual Property Office (KIPO), the disclosure of which are incorporated by reference herein in their entireties.

BACKGROUND

1. Field

Embodiments of the present disclosure relate to a display device, and more particularly to a display device that is operable in a variable frequency mode, and a pixel of the display device.

2. Description of the Related Art

In general, a display device may display an image at a fixed frame frequency (or a constant refresh rate) of about 60 Hz, about 120 Hz, about 240 Hz, or the like. However, a frame frequency of rendering by a host processor (e.g., a graphics processing unit (GPU) or a graphics card) providing frame data to the display device may be different from the frame frequency of the display device. In particular, when the host processor provides the display device with frame data for a game image (gaming image) that requires complicated rendering, the frame frequency mismatch may be intensified, and a tearing phenomenon where a boundary line is caused by the frame frequency mismatch in an image of the display device may occur.

To prevent or reduce the tearing phenomenon, a variable frequency mode (e.g., a Free-Sync mode, a G-Sync mode, etc.) has been developed in which a host processor provides frame data to a display device at a variable frame frequency by changing a time length (or a duration of time) of a blank period in each frame period. A display device supporting the variable frequency mode may display an image in synchronization with the variable frame frequency, or may drive a display panel at the variable frame frequency or a variable driving frequency, thereby reducing or preventing the tearing phenomenon.

However, in the display device operating in the variable frequency mode, a luminance of the display panel driven at a first driving frequency and a luminance of the display panel driven at a second driving frequency different from the first driving frequency may be different from each other, and thus a flicker may occur when a driving frequency of the display panel is changed.

SUMMARY

Some embodiments provide a display device capable of displaying an image with uniform luminance at different driving frequencies.

Some embodiments provide a pixel of a display device capable of displaying an image with uniform luminance at different driving frequencies.

According to embodiments, there is provided a display device including a display panel including a pixel, and a panel driver connected to the display panel and configured to receive input image data in a variable frame frequency in order to drive the display panel based on the input image data. A frame period for the display panel is divided into at least one scan period and at least one or more hold periods, and a time during which the pixel performs an anode initialization operation in each of the hold periods is longer than a time during which the pixel performs the anode initialization operation in the scan period.

In embodiments, the pixel may perform the anode initialization operation in response to an anode initialization signal, and the panel driver may gradually increase a number of the anode initialization signal applied to the pixel in the hold periods.

In embodiments, the pixel may perform the anode initialization operation in response to an anode initialization signal, and the panel driver may gradually increase a width of the anode initialization signal applied to the pixel in each of the hold periods.

In embodiments, the panel driver may determine the frame period for the display panel according to the variable frame frequency such that a time length of the frame period corresponds to N times of a time length of a minimum frame period, where N is an integer greater than 0. The panel driver may divide the frame period into the scan period having a time length corresponding to the time length of the minimum frame period, and the hold periods of which a number corresponds to N−1, and each of the N−1 hold periods may have a time length corresponding to the time length of the minimum frame period.

In embodiments, the pixel may perform the anode initialization operation in response to an anode initialization signal. The panel driver may apply the anode initialization signal to the pixel in the scan period for one time, and may increase a number of the anode initialization signal applied to the pixel by one in each of the N−1 hold periods.

In embodiments, the pixel may perform the anode initialization operation in response to an anode initialization signal. The panel driver may apply the anode initialization signal having a first width to the pixel in the scan period, and may increase a width of the anode initialization signal applied to the pixel by a second width in each of the N−1 hold periods.

In embodiments, the pixel may include a light emitting element including an anode, and a cathode coupled to a line of a power supply voltage, and an anode initialization transistor configured to perform the anode initialization operation by applying an anode initialization voltage to the anode of the light emitting element. The anode initialization voltage may be set corresponding to a sum of the power supply voltage and a threshold voltage of the light emitting element.

In embodiments, the pixel may perform the anode initialization operation by using an anode initialization voltage, and the panel driver may gradually decrease the anode initialization voltage in the hold periods.

In embodiments, the scan period may include a gate initialization period in which the pixel performs a gate initialization operation, a threshold voltage compensation period in which the pixel performs a threshold voltage compensation operation, a data writing period in which the pixel performs a data writing operation, an anode initialization period in which the pixel performs the anode initialization operation, and an emission period in which the pixel performs an emission operation. Each of the hold periods may include the anode initialization period in which the pixel performs the anode initialization operation, and the emission period in which the pixel performs the emission operation.

In embodiments, the panel driver may include a data driver configured to provide a data voltage corresponding to the input image data to the pixel, a scan driver configured to provide a gate initialization signal, a compensation signal, a writing signal and an anode initialization signal to the pixel in the scan period, and to provide the anode initialization signal to the pixel in each of the hold periods, an emission driver configured to provide an emission signal to the pixel in each of the scan period and the hold periods, and a controller configured to control the data driver, the scan driver and the emission driver.

In embodiments, the pixel may include a first capacitor coupled between a line of a first power supply voltage and a first node, a second capacitor coupled between the first node and a second node, a first transistor having a gate coupled to the second node, a second transistor configured to transfer a data voltage to the first node in response to a writing signal, a third transistor configured to diode-connect the first transistor in response to a compensation signal, a fourth transistor configured to apply a gate initialization voltage to the second node in response to a gate initialization signal, a fifth transistor configured to apply a reference voltage to the first node in response to the compensation signal, a sixth transistor configured to couple the first transistor and a light emitting element in response to an emission signal, a seventh transistor configured to apply an anode initialization voltage to an anode of the light emitting element in response to an anode initialization signal, and the light emitting element including the anode, and a cathode coupled to a line of a second power supply voltage.

In embodiments, the panel driver may determine the frame period for the display panel based on the variable frame frequency such that a time length of the frame period corresponds to M times of an emission cycle, where M is an integer greater than 0. The panel driver may divide the frame period into the scan period having a time length corresponding to L times of the emission cycle, and the hold periods of which a number corresponds to M-L, and each of the M-L hold periods may have a time length corresponding to the emission cycle, where Lis an integer greater than 0 and less than or equal to M.

In embodiments, the pixel may perform the anode initialization operation in response to an anode initialization signal. The panel driver may apply the anode initialization signal once to the pixel in each of L emission cycles of the scan period, and may increase a number of applying the anode initialization signal to the pixel by one per L hold periods of the M-L hold periods.

In embodiments, the pixel may perform the anode initialization operation in response to an anode initialization signal. The panel driver may apply the anode initialization signal once to the pixel in each of L emission cycles of the scan period, and may increase a number of applying the anode initialization signal to the pixel by one in each of the M-L hold periods.

In embodiments, the pixel may perform the anode initialization operation in response to an anode initialization signal. The panel driver may apply the anode initialization signal having a first width to the pixel in each of L emission cycles of the scan period, and may increase a width of the anode initialization signal applied to the pixel by a second width per L hold periods of the M-L hold periods.

In embodiments, the pixel may perform the anode initialization operation in response to an anode initialization signal. The panel driver may apply the anode initialization signal having a first width to the pixel in each of L emission cycles of the scan period, and may increase a width of the anode initialization signal applied to the pixel by a second width in each of the M-L hold periods.

According to embodiments, there is provided a display device including a display panel including a pixel that performs an anode initialization operation by an anode initialization voltage, and a panel driver configured to receive input image data in a variable frame frequency in order to drive the display panel based on the input image data. A frame period for the display panel is divided into at least one scan period and at least one or more hold periods, and a voltage level of the anode initialization voltage in each of the hold periods is different from a voltage level of the anode initialization voltage in the scan period.

In embodiments, the panel driver may gradually decrease the anode initialization voltage in the hold periods such that the anode initialization voltage decreases by a predetermined voltage difference in each of the hold periods.

According to embodiments, there is provided a pixel of display device including a first capacitor coupled between a line of a first power supply voltage and a first node, a second capacitor coupled between the first node and a second node, a first transistor including a gate coupled to the second node, a second transistor configured to transfer a data voltage to the first node in response to a writing signal, a third transistor configured to diode-connect the first transistor in response to a compensation signal, a fourth transistor configured to apply a gate initialization voltage to the second node in response to a gate initialization signal, a fifth transistor configured to apply a reference voltage to the first node in response to the compensation signal, a sixth transistor configured to couple the first transistor and a light emitting element in response to an emission signal, a seventh transistor configured to perform an anode initialization operation that applies an anode initialization voltage to an anode of the light emitting element in response to an anode initialization signal, and the light emitting element including the anode, and a cathode coupled to a line of a second power supply voltage. A frame period for the pixel includes at least one scan period and at least one or more hold periods, and a discharging degree of a parasitic capacitor of the light emitting element by the anode initialization operation gradually increases in the hold periods.

In embodiments, in the hold periods, to gradually increase the discharging degree of the parasitic capacitor, a number of applying the anode initialization signal to the pixel may gradually increase, a width of the anode initialization signal may gradually increase, or the anode initialization voltage may gradually decrease.

As described above, in a display device according to embodiments, a time during which each pixel performs an anode initialization operation in a hold period may be longer than a time during which each pixel performs the anode initialization operation in a scan period. Accordingly, a luminance increase in the hold period may be prevented or reduced, and a luminance difference between different driving frequencies may be prevented or reduced.

Further, in the display device according to embodiments, a voltage level of an anode initialization voltage in the hold period may be different from a voltage level of the anode initialization voltage in the scan period. Accordingly, a luminance increase in the hold period may be prevented or reduced, and a luminance difference between different driving frequencies may be prevented or reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, embodiments of the present disclosure will be explained in detail with reference to the accompanying drawings.

Figure 1:
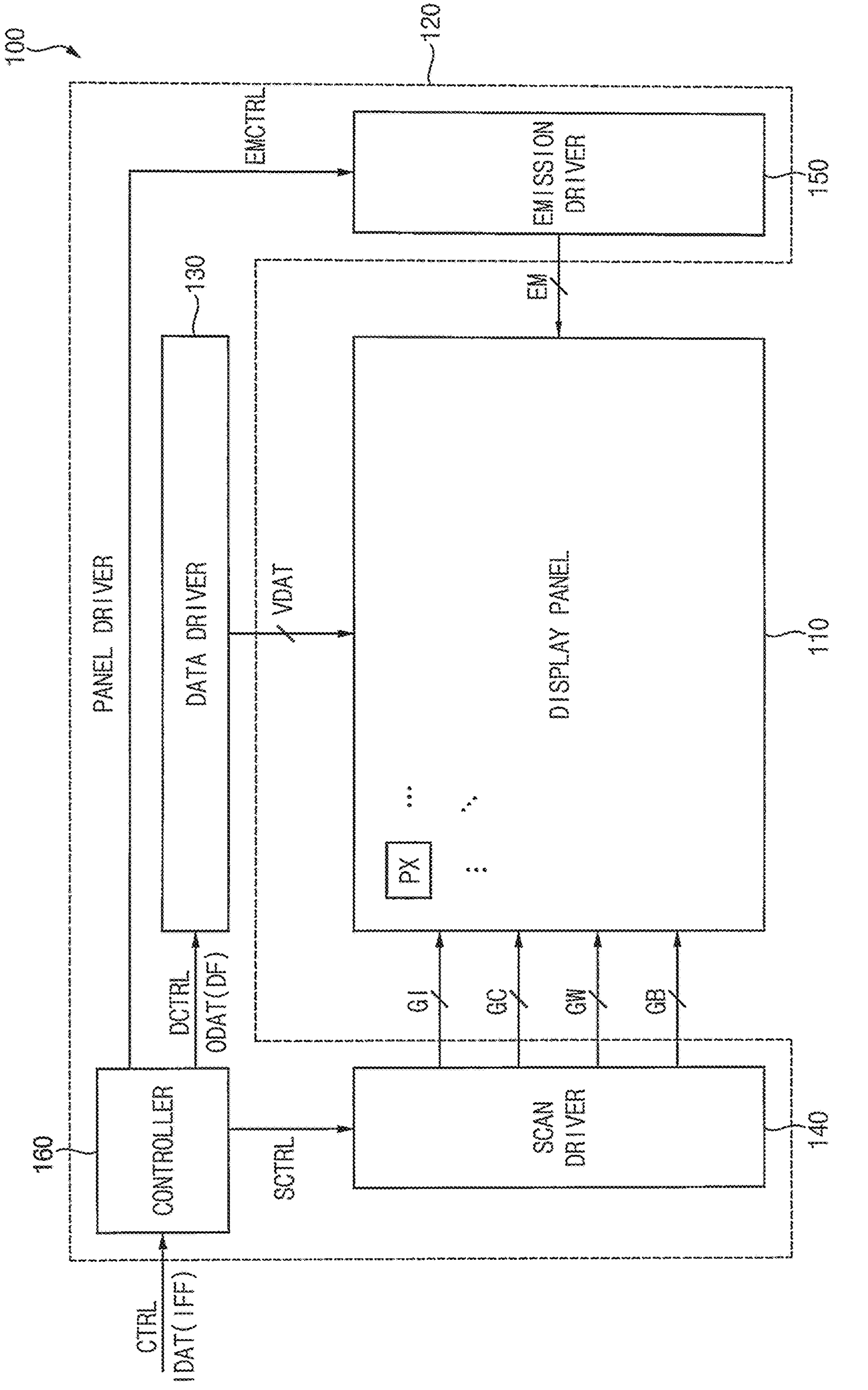
FIG. 1 is a block diagram illustrating a display device according to embodiments.
Figure 2:
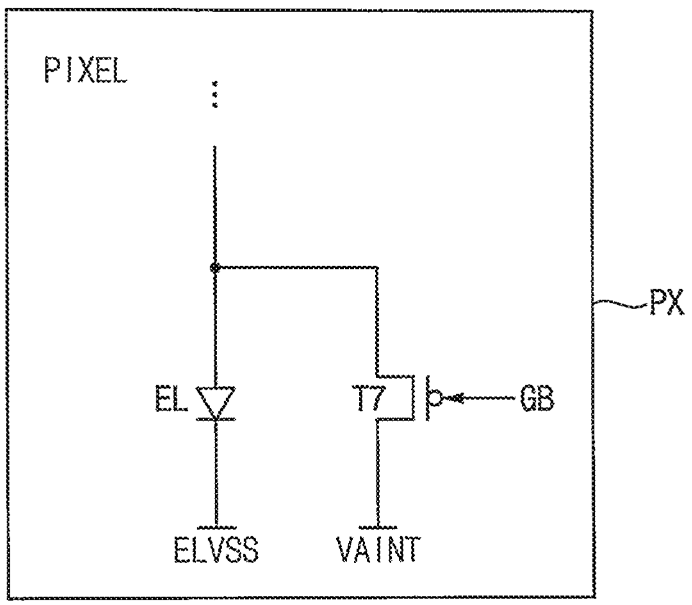
FIG. 2 is a diagram illustrating an example of a pixel included in a display device according to embodiments.
Figure 3:
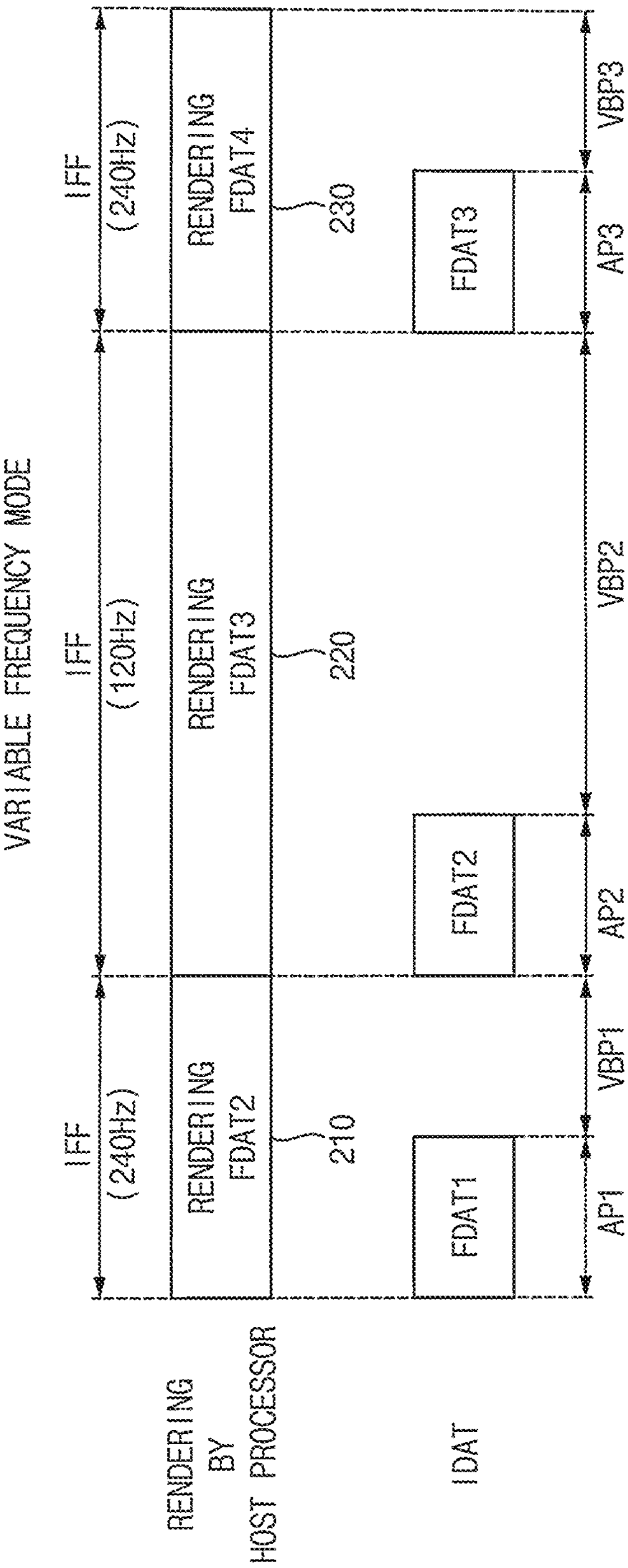
FIG. 3 is a diagram for describing an example of an operation of a display device in a variable frequency mode according to embodiments.
Figure 4:
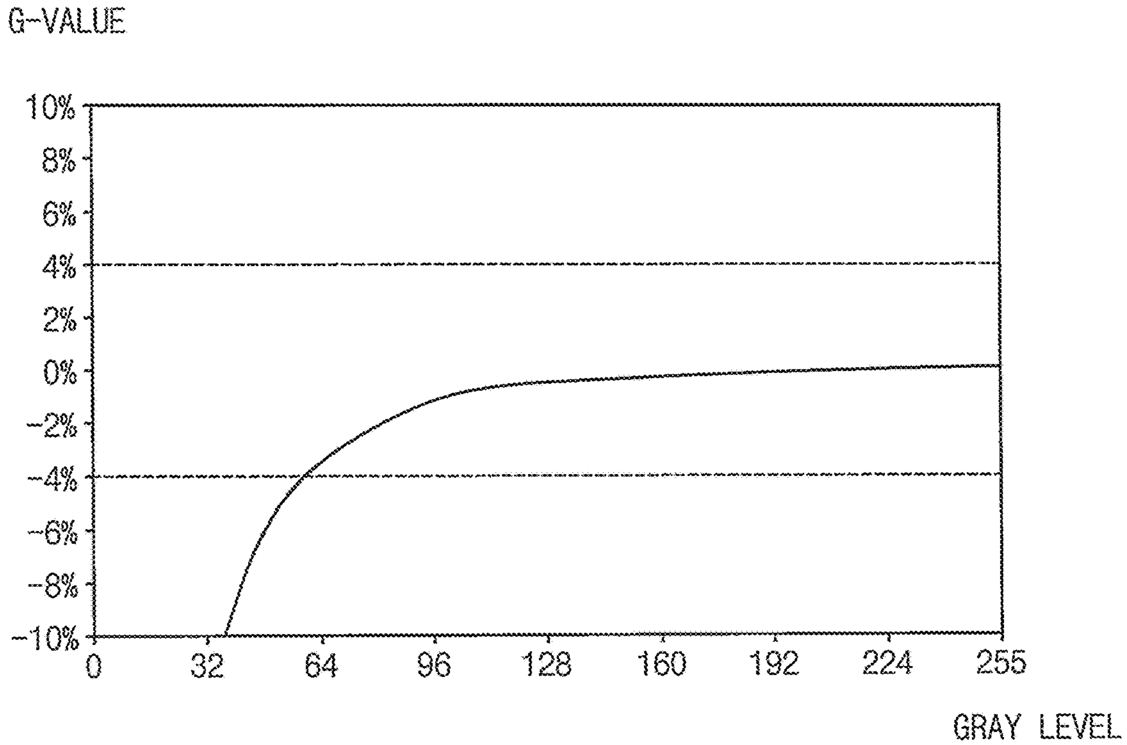
FIG. 4 is a diagram illustrating an example of a G-value of a conventional display device.
Figure 5:
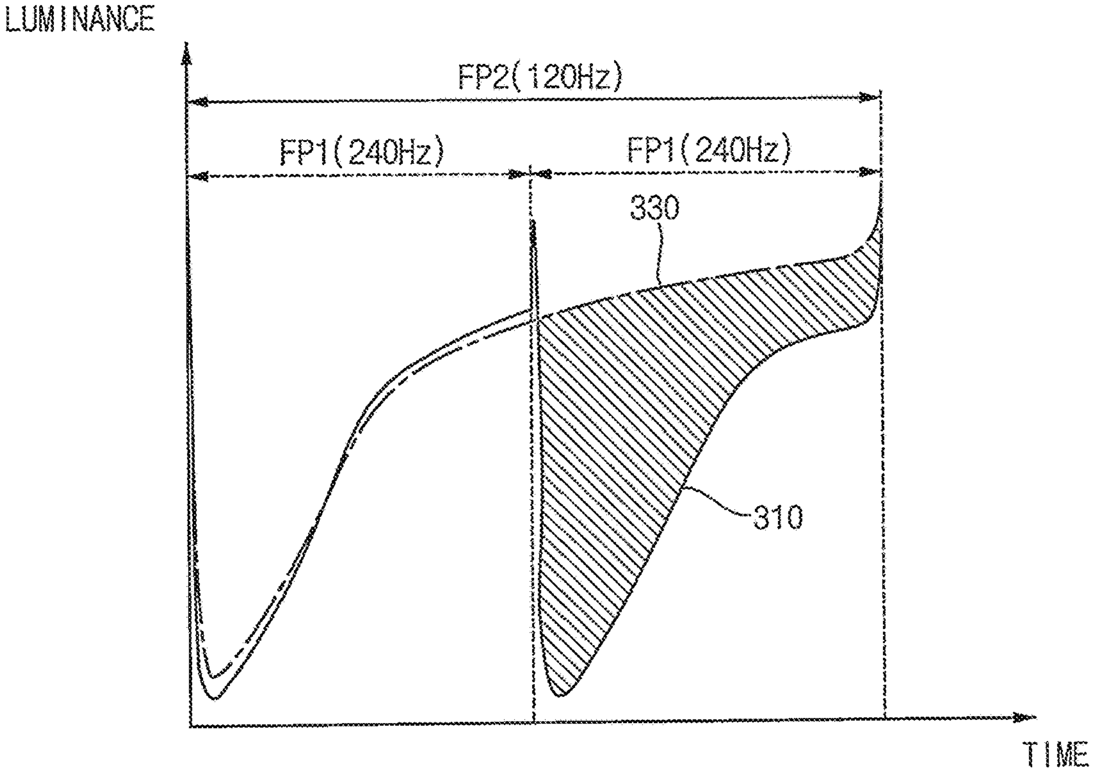
FIG. 5 is a diagram illustrating an example of luminances of a display panel driven at driving frequencies of about 240 Hz and about 120 Hz in a conventional display device.
Figure 6:
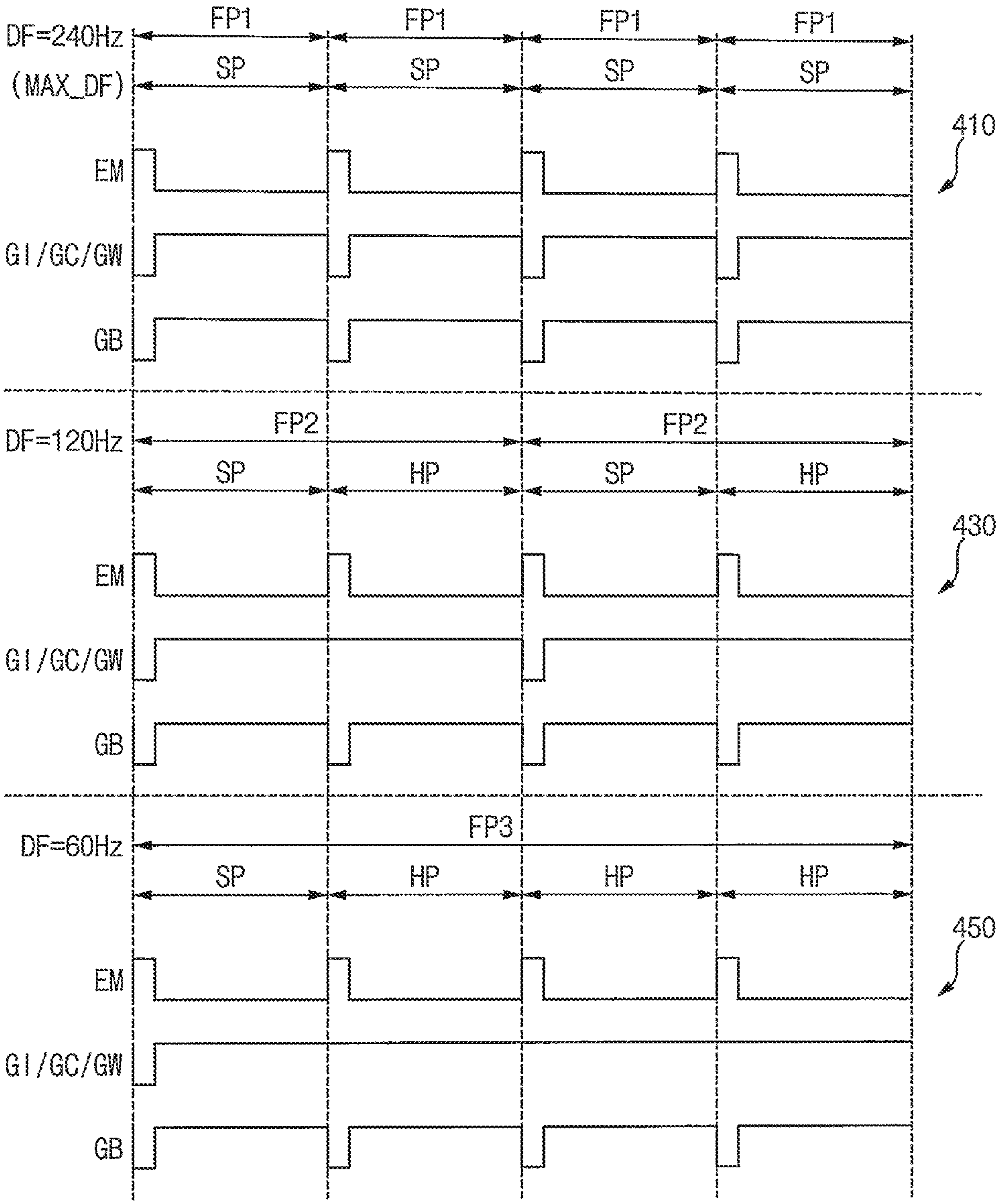
FIG. 6 is a timing diagram for describing an example of an operation of a display device that performs an anode initialization operation with a constant period at different driving frequencies.
Figure 7:
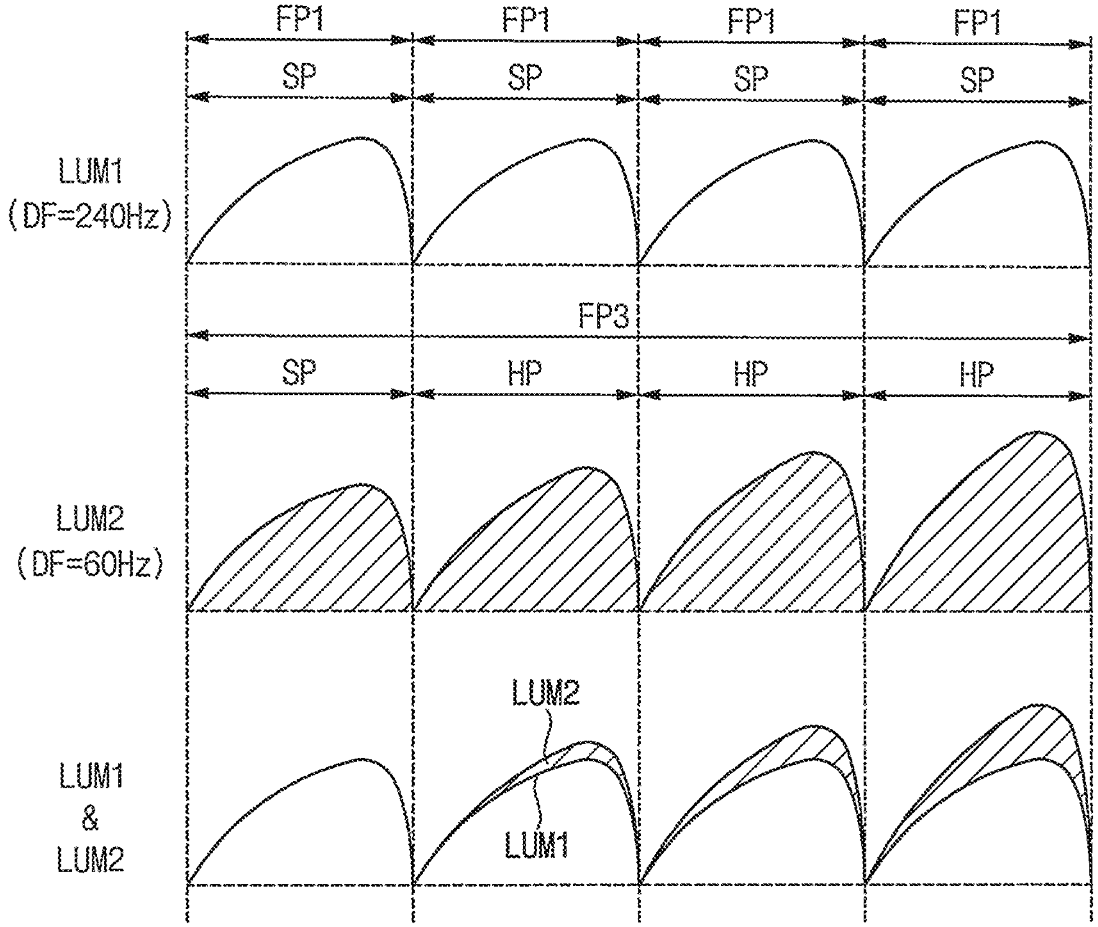
FIG. 7 is a diagram illustrating an example of luminances of a display panel driven at driving frequencies of about 240 Hz and about 60 Hz in a display device of FIG. 6.
Figure 8:
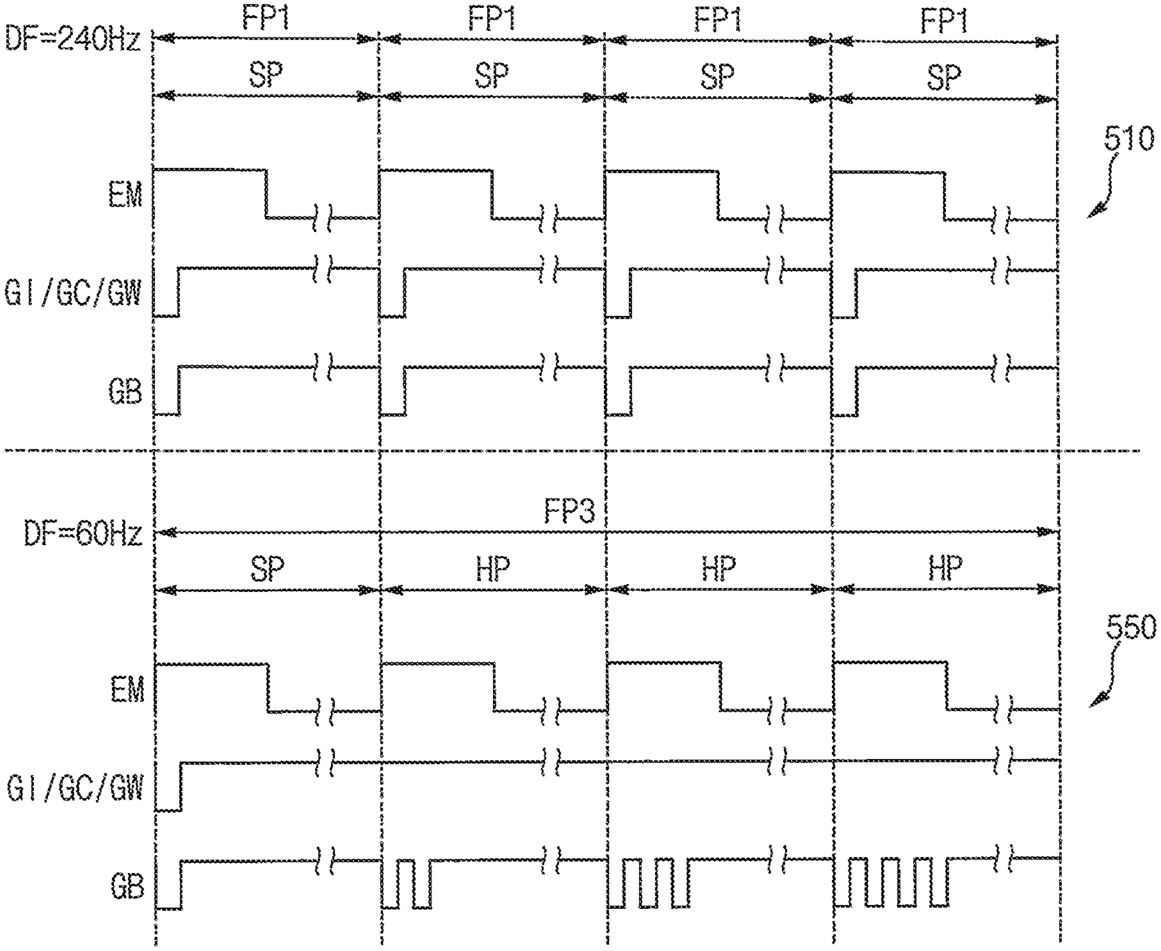
FIG. 8 is a timing diagram for describing examples of an operation of a display device according to embodiments.
Figure 9:
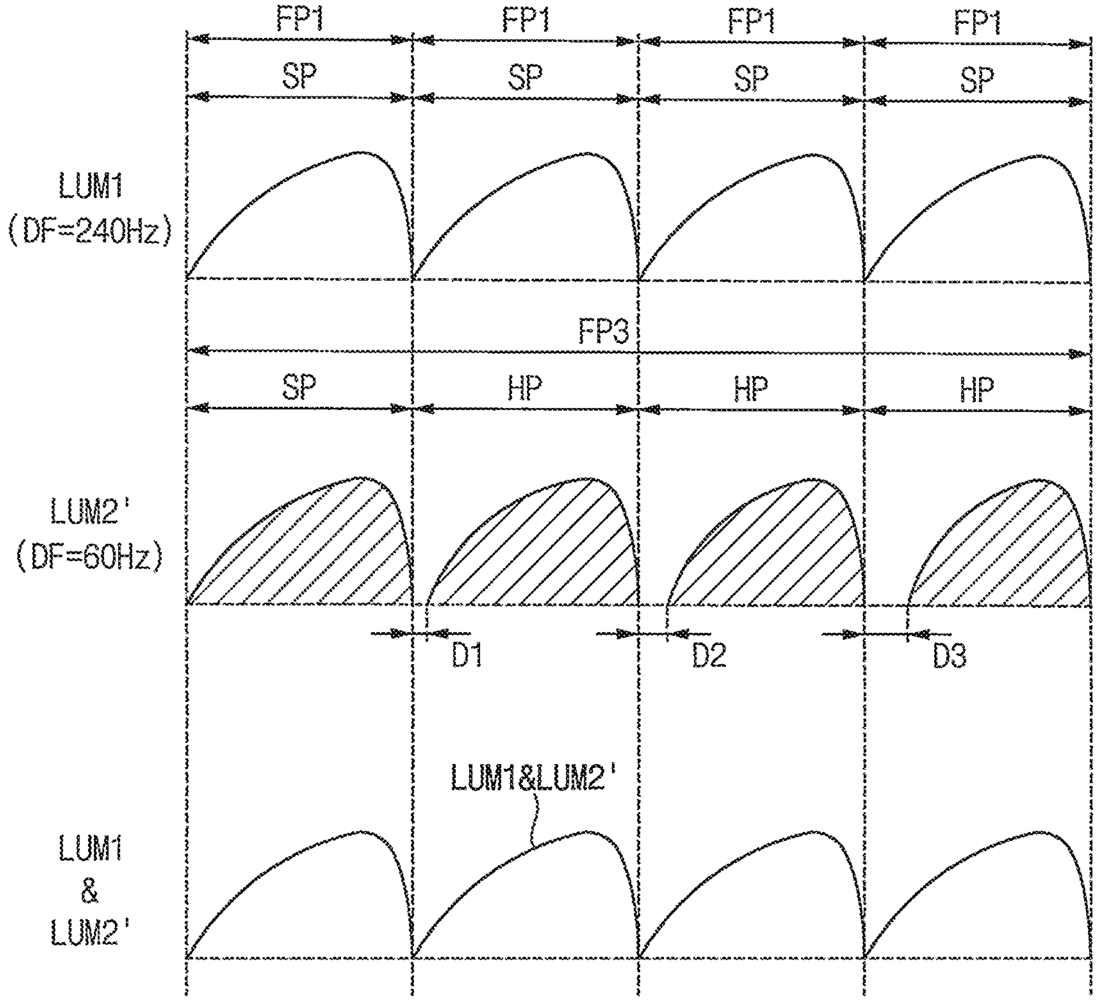
FIG. 9 is a diagram illustrating an example of luminances of a display panel driven at driving frequencies of about 240 Hz and about 60 Hz in a display device according to embodiments.

FIG. 1 is a block diagram illustrating a display device according to embodiments, FIG. 2 is a diagram illustrating an example of a pixel included in a display device according to embodiments, FIG. 3 is a diagram for describing an example of an operation of a display device in a variable frequency mode according to embodiments, FIG. 4 is a diagram illustrating an example of a G-value of a conventional display device, FIG. 5 is a diagram illustrating an example of luminances of a display panel driven at driving frequencies of about 240 Hz and about 120 Hz in a conventional display device, FIG. 6 is a timing diagram for describing an example of an operation of a display device that performs an anode initialization operation with a constant period at different driving frequencies, FIG. 7 is a diagram illustrating an example of luminances of a display panel driven at driving frequencies of about 240 Hz and about 60 Hz in a display device of FIG. 6, FIG. 8 is a timing diagram for describing examples of an operation of a display device according to embodiments, and FIG. 9 is a diagram illustrating an example of luminances of a display panel driven at driving frequencies of about 240 Hz and about 60 Hz in a display device according to embodiments.

Referring to FIG. 1, a display device 100 according to embodiments may include a display panel 110 that includes a plurality of pixels PX, and a panel driver 120 that drives the display panel 110 based on input image data IDAT. In some embodiments, the panel driver 120 may include a data driver 130 that provides data voltages VDAT to the plurality of pixels PX, a scan driver 140 that provides gate initialization signals GI, compensation signals GC, writing signals GW and anode initialization signals GB to the plurality of pixels PX, an emission driver 150 that provides emission signals EM to the plurality of pixels PX, and a controller 160 that controls the data driver 130, the scan driver 140 and the emission driver 150.

The display panel 110 may include the plurality of pixels PX arranged in a matrix form having a plurality of rows and a plurality of columns. Each pixel PX may perform an anode initialization operation in response to the anode initialization signal GB. In some embodiments, as illustrated in FIG. 2, each pixel PX may include a light emitting element EL having an anode, and a cathode coupled to a line of a power supply voltage ELVSS, and an anode initialization transistor T7 that receives the anode initialization signal GB. The anode initialization transistor T7 may perform the anode initialization operation that applies an anode initialization voltage VAINT to the anode of the light emitting element EL in response to the anode initialization signal GB. A parasitic capacitor of the light emitting element EL may be discharged by the anode initialization operation. In some embodiments, the anode initialization voltage VAINT may have a voltage level substantially the same as a voltage level of the power supply voltage ELVSS. In other embodiments, the anode initialization voltage VAINT maybe set corresponding to a sum of the power supply voltage ELVSS and a threshold voltage of the light emitting element EL (or an average threshold voltage or a minimum threshold voltage of the light emitting elements EL of the pixels PX of the display panel 110).

The data driver 130 may provide data voltages VDAT to the plurality of pixels PX based on a data control signal DCTRL and output image data ODAT received from the controller 160. In some embodiments, the data control signal DCTRL may include, but not limited to, an output data enable signal, a horizontal start signal and a load signal. The data driver 130 may receive, as the output image data ODAT, frame data at a driving frequency DF of the display panel 110. In some embodiments, the data driver 130 and the controller 160 may be implemented with a single integrated circuit, and the single integrated circuit may be referred to as a timing controller embedded data driver (TED). In other embodiments, the data driver 130 and the controller 160 may be implemented with separate integrated circuits.

The scan driver 140 may provide the gate initialization signals GI, the compensation signals GC, the writing signals GW and the anode initialization signals GB to the plurality of pixels PX based on a scan control signal SCTRL received from the controller 160. In some embodiments, the scan control signal SCTRL may include, but not limited to, a scan start signal and a scan clock signal. In some embodiments, the scan driver 140 may sequentially provide the gate initialization signals GI, the compensation signals GC, the writing signals GW and the anode initialization signals GB to the plurality of pixels PX on a row-by-row basis. In some embodiments, the scan driver 140 may be integrated or formed in a peripheral portion of the display panel 110. In other embodiments, the scan driver 140 may be implemented with one or more integrated circuits.

The emission driver 150 may provide the emission signals EM to the plurality of pixels PX based on an emission control signal EMCTRL received from the controller 160. In some embodiments, the emission control signal EMCTRL may include, but not limited to, an emission start signal and an emission clock signal. In some embodiments, the emission driver 150 may sequentially provide the emission signals EM to the plurality of pixels PX on a row-by-row basis. In some embodiments, the emission driver 150 may be integrated or formed in the peripheral portion of the display panel 110. In other embodiments, the emission driver 150 may be implemented with one or more integrated circuits.

The controller 160 (e.g., a timing controller (TCON)) may receive the input image data IDAT and a control signal CTRL received from an external host processor (e.g., an application processor (AP), a graphics processing unit (GPU) or a graphics card). In some embodiments, the control signal CTRL may include, but not limited to, a vertical synchronization signal, a horizontal synchronization signal, an input data enable signal, a master clock signal, etc. The controller 160 may generate the output image data ODAT, the data control signal DCTRL, the scan control signal SCTRL and the emission control signal EMCTRL based on the input image data IDAT and the control signal CTRL. The controller 160 may control an operation of the data driver 130 by providing the output image data ODAT and the data control signal DCTRL to the data driver 130, may control an operation of the scan driver 140 by providing the scan control signal SCTRL to the scan driver 140, and may control an operation of the emission driver 150 by providing the emission control signal EMCTRL to the emission driver 150.

The display device 100 according to embodiments may operate not only in a normal mode in which the display panel 110 is driven at a fixed driving frequency DF (e.g., of about 240 Hz), but also in a variable frequency mode in which the display panel 110 is driven at a variable driving frequency DF. In the normal mode, the host processor may provide the input image data IDAT to the controller 160 at a fixed (or constant) frame frequency IFF, and the driving frequency DF of the display panel 110 may be determined as the fixed frame frequency IFF. Thus, the controller 160 may control the data driver 130, the scan driver 140 and the emission driver 150 to drive the display panel 110 at the fixed frame frequency IFF, or at the fixed driving frequency DF.

In the variable frequency mode, the host processor may provide the input image data IDAT to the controller 160 at a variable frame frequency IFF (or a variable frame rate) by changing a time length (or a duration of time) of a blank period in each frame period, and the driving frequency DF of the display panel 110 may be determined according to the variable frame frequency IFF. Thus, the controller 160 may control the data driver 130, the scan driver 140 and the emission driver 150 to drive the display panel 110 at the variable frame frequency IFF, or at the variable driving frequency DF. For example, the variable frame frequency IFF or the variable frame rate may be changed within a range, but not limited to, from about 1 Hz to about 240 Hz. Further, for example, the variable frequency mode may be, but not be limited to, a Free-Sync mode, a G-Sync mode, etc.

For example, as illustrated in FIG. 3, periods or frequencies of renderings 210, 220, and 230 by the host processor (e.g., the AP, the GPU or the graphics card) may vary (in particular, in a case where game image data are rendered), and the host processor may provide the input image data IDAT, or frame data FDAT1, FDAT2 and FDAT3 to the display device 100 in synchronization with these irregular periods or frequencies of the renderings 210, 220, and 230 in the variable frequency mode. In an example of FIG. 3, the host processor may output first frame data FDAT1 in a first active period AP1, and a first variable blank period VBP1 may continue until the rendering 210 for second frame data FDAT2 is completed. Thus, if the rendering 210 for the second frame data FDAT2 is performed at a frequency of about 240 Hz, the host processor may provide the first frame data FDAT1 to the display device 100 at the frame frequency IFF of about 240 Hz. Further, the host processor may output the second frame data FDAT2 in a second active period AP2, and a second variable blank period VBP2 may continue until the rendering 220 for third frame data FDAT3 is completed. Thus, if the rendering 220 for the third frame data FDAT3 is performed at a frequency of about 120 Hz, the host processor may provide the second frame data FDAT2 to the display device 100 at the frame frequency IFF of about 120 Hz. Further, the host processor may output the third frame data FDAT3 in a third active period AP3, and a third variable blank period VBP3 may continue until the rendering 230 for fourth frame data FDAT4 is completed. Thus, if the rendering 230 for the fourth frame data FDAT4 is performed at a frequency of about 240 Hz, the host processor may provide the third frame data FDAT3 to the display device 100 at the frame frequency IFF of about 240 Hz.

In the variable frequency mode, the display device 100 may prevent a tearing phenomenon caused by a frame frequency mismatch by displaying an image in synchronization with the variable frame frequency IFF. However, a conventional display device operating in the variable frequency mode may have a luminance difference between different driving frequencies. FIG. 4 illustrates an example of a G-value of a conventional display device operating in the variable frequency mode. The G-value may be determined by using an equation, "G-VALUE=(LUM(MAXFREQ)−LUM(MAXFREQ/2))/LUM(MAXFREQ)", where G-VALUE represents the G-value, LUM(MAXFREQ) represents a luminance of a display panel driven at the maximum frequency (e.g., about 120 Hz or about 240 Hz) of the variable frame frequency IFF, and LUM(MAXFREQ/2) represents a luminance of the display panel driven at a half (e.g., about 60 Hz or about 120 Hz) of the maximum frequency. In the example of FIG. 4, the G-value of the conventional display device may have an absolute value lower than about 4% at a gray level greater than about a 60-gray level, but may have an absolute value higher than about 4% at a gray level less than or equal to about the 60-gray level. Thus, in the variable frequency mode, when a low gray image (e.g., lower than the 60-gray level) is displayed, the display panel of the conventional display device may have a great luminance difference between different driving frequencies (or different frame frequencies), and a flicker may occur when the driving frequency (or the frame frequency) of the display panel is changed.

The luminance difference between the different driving frequencies may be caused because, as illustrated in FIG. 5, light waveforms 310 and 330 of the display panel at the different driving frequencies have different numbers of luminance valleys (in particular, when displaying the low gray image). That is, in an example of FIG. 5, during the same time period, the display panel driven at about 240 Hz may have two frame periods FP1, and the display panel driven at about 120 Hz may have one frame period FP2. Further, in the conventional display device, each pixel may perform an anode initialization operation only once in each frame period FP1 and FP2, and each light waveform 310 and 330 of the display panel may have one luminance valley in each frame period FP1 and FP2 due to the anode initialization operation (e.g., because a driving current generated by a driving transistor may be consumed to charge a parasitic capacitor of a light emitting element discharged by the anode initialization operation). Thus, during the same time period, the display panel driven at about 240 Hz may have two luminance valleys, the display panel driven at about 120 Hz may have one luminance valley, and thus a luminance of the display panel driven at about 120 Hz may be higher than a luminance of the display panel driven at about 240 Hz (in particular, when displaying the low gray image).

However, in the display device 100 according to embodiments, to prevent or reduce the luminance difference between the different driving frequencies DF, each pixel PX may perform the anode initialization operation with a constant period or at a constant frequency (e.g., the maximum frequency of the variable frame frequency IFF, or a maximum driving frequency MAX_DF illustrated in FIG. 6) regardless of the driving frequency DF. To periodically perform the anode initialization operation regardless of the driving frequency DF, the panel driver 120 may determine a frame period for the display panel 110 according to the variable frame frequency IFF such that a time length of the frame period corresponds to N times of a time length of a minimum frame period, where N is an integer greater than 0. Here, the minimum frame period may be a frame period corresponding to the maximum frequency of the variable frame frequency IFF, or the maximum driving frequency MAX_DF for the display panel 110. For example, in a case where the maximum frequency of the variable frame frequency IFF or the maximum driving frequency MAX_DF for the display panel 110 is about 240 Hz, the minimum frame period may have the time length of about 4.2 ms. In this case, the panel driver 120 may set the frame period for the display panel 110 to have one time length that is selected corresponding to the variable frame frequency IFF from among time lengths corresponding to N times of about 4.2 ms, for example from among time lengths corresponding to about 4.2 ms, about 8.3 ms, about 12.5 ms, about 16.7 ms, etc.

In some embodiments, the host processor may provide the input image data IDAT to the panel driver 120 at one of discrete variable frame frequencies IFF corresponding to N times of the minimum frame period. For example, the maximum frequency of the variable frame frequencies IFF may be 240 Hz, and the variable frame frequencies IFF may be, but not be limited to, about 240 Hz, about 120 Hz, about 80 Hz, about 60 Hz, about 48 Hz, etc. Further, the panel driver 120 may determine the driving frequency DF for the display panel 110 substantially the same as the variable frame frequency IFF such that the frame period for the display panel 110 may have a time length corresponding to the variable frame frequency IFF. For example, in a case where the input image data IDAT are received at the variable frame frequency IFF of about 240 Hz, the panel driver 120 may determine the driving frequency DF as about 240 Hz, and may determine the time length of the frame period as about 4.2 ms corresponding to about 240 Hz.

In other embodiments, the host processor may provide the input image data IDAT to the panel driver 120 at a continuous variable frame frequency IFF. For example, the variable frame frequency IFF may range, but not limited to, from about 1 Hz to about 240 Hz. Further, the panel driver 120 may select the driving frequency DF close to the variable frame frequency IFF from among discrete driving frequencies DF corresponding to N times of the minimum frame period, and may determine the frame period corresponding to the selected driving frequency DF. For example, the maximum frequency of the variable frame frequency IFF or the maximum driving frequency MAX_DF may be about 240 Hz, and the driving frequency DF for the display panel 110 may be determined as one of about 240 Hz, about 120 Hz, about 80 Hz, about 60 Hz, about 48 Hz, etc.

Further, the panel driver 120 may divide the frame period corresponding to N times of the minimum frame period into one scan period having a time length corresponding to the time length of the minimum frame period, and N−1 hold periods each having a time length corresponding to the time length of the minimum frame period. Here, the scan period may be a period in which the data voltages VDAT are provided to the plurality of pixels PX of the display panel 110, and the hold period may be a period in which the plurality of pixels PX maintains the data voltages VDAT. Further, the panel driver 120 may apply the anode initialization signal GB to each pixel PX in each of the scan period and the hold period. Thus, each pixel PX may perform the anode initialization operation in response to the anode initialization signal GB in each of the scan and hold periods having the same time length. Accordingly, each pixel PX may periodically perform the anode initialization operation regardless of the driving frequency DF.

For example, as illustrated as a first timing diagram 410 of FIG. 6, in a case where the driving frequency DF is the maximum driving frequency MAX_DF, or about 240 Hz, the panel driver 120 may set each frame period FP1 as the scan period SP. Further, as illustrated as a second timing diagram 430 of FIG. 6, in a case where the driving frequency DF is a half of the maximum driving frequency MAX_DF, or about 120 Hz, or in a case where each frame period FP2 corresponds to two times of the minimum frame period FP1, the panel driver 120 may divide each frame period FP2 into one scan period SP and one hold period HP. Further, as a third timing diagram 450 of FIG. 6, in a case where the driving frequency DF is a quarter of the maximum driving frequency MAX_DF, or about 60 Hz, or in a case where each frame period FP3 corresponds to four times of the minimum frame period FP1, the panel driver 120 may divide each frame period FP3 into one scan period SP and three hold periods HP. In the scan period SP, the panel driver 120 may apply the emission signal EM, the gate initialization signal GI, the compensation signal GC, the writing signal GW and the anode initialization signal GB to each pixel PX, and each pixel PX may perform the anode initialization operation in response to the anode initialization signal GB. Further, in the hold period HP, the panel driver 120 may apply the emission signal EM and the anode initialization signal GB to each pixel PX, and each pixel PX may perform the anode initialization operation in response to the anode initialization signal GB. Thus, in the display device 100 according to embodiments, each pixel PX may perform the anode initialization operation not only in the scan period SP but also in the hold period HP, and thus may periodically perform the anode initialization operation regardless of the driving frequency DF. Although the gate initialization signal GI, the compensation signal GC, the writing signal GW and the anode initialization signal GB are illustrated as being applied at the same timing in FIGS. 6, 8 and 10 through 18 for convenience of illustration, according to embodiments, at least a portion of the gate initialization signal GI, the compensation signal GC, the writing signal GW and the anode initialization signal GB may be applied at different timings. For example, the emission signal EM, the gate initialization signal GI, the compensation signal GC, the writing signal GW and the anode initialization signal GB may be applied at timings illustrated in FIG. 21, timings illustrated in FIG. 23, timings illustrated in FIG. 26, timings illustrated in FIG. 28, or the like.

If the anode initialization operation is performed with the constant period regardless of the driving frequency DF, light waveforms of the display panel 110 driven at different driving frequencies DF may have the same number of luminance valleys during the same time period. For example, as illustrated in FIG. 7, a light waveform LUM1 of the display panel 110 driven at the driving frequency of about 240 Hz and a light waveform LUM2 of the display panel 110 driven at the driving frequency of about 60 Hz may have the same number of luminance valleys during the same time period. However, even if the anode initialization operation is performed with the constant period regardless of the driving frequency DF, since each pixel PX stores new data voltage VDAT in the scan period SP, but maintains the stored data voltage VDAT in the hold period HP, a distortion of the data voltage VDAT caused by a leakage current of each pixel PX may be accumulated as the hold periods HP continue. Accordingly, a luminance of the display panel 110 may be increased in the hold periods HP, and thus a luminance of the display panel 110 driven at a relatively low driving frequency DF may be higher than a luminance of the display panel 110 driven at a relatively high driving frequency DF. For example, as illustrated in FIG. 7, the light waveform LUM2 of the display panel 110 driven at the driving frequency of about 60 Hz may be higher than the light waveform LUM1 of the display panel 110 driven at the driving frequency of about 240 Hz.

To prevent or reduce the luminance increase in the hold period HP or the luminance difference between the different driving frequencies DF, in the display device 100 according to embodiments, a time during which each pixel PX performs the anode initialization operation in each hold period HP may be longer than a time during which each pixel PX performs the anode initialization operation in the scan period SP. In some embodiments, to gradually increase the time during which the anode initialization operation is performed in the consecutive hold periods HP, the panel driver 120 may gradually increase the number of applying the anode initialization signal GB to each pixel PX in the consecutive hold periods HP.

In some embodiments, a frame period corresponding to N times of the minimum frame period may be divided into one scan period SP and N−1 hold periods HP, and the panel driver 120 may apply the anode initialization signal GB once to each pixel PX in the scan period SP, and may increase the number of applying the anode initialization signal to each pixel PX by one in each of the N−1 hold periods HP. For example, as illustrated as a first timing diagram 510 of FIG. 8, in a case where the driving frequency DF is about 240 Hz, each frame period FP1 may be set as the scan period SP. In this case, the panel driver 120 may apply the anode initialization signal GB once to each pixel PX in each scan period SP, and each pixel PX may perform the anode initialization operation once in each scan period SP. Alternatively, as illustrated as a second timing diagram 550 of FIG. 8, in a case where the driving frequency DF is about 60 Hz, each frame period FP3 may be divided into the scan period SP and first, second, and third hold periods HP. In this case, the panel driver 120 may apply the anode initialization signal GB once to each pixel PX in the scan period SP, may apply the anode initialization signal GB two times to each pixel PX in the first hold period HP, may apply the anode initialization signal GB three times to each pixel PX in the second hold period HP, and may apply the anode initialization signal GB four times to each pixel PX in the third hold period HP. Thus, each pixel PX may perform the anode initialization operation once in the scan period SP, may perform the anode initialization operation two times in the first hold period HP, may perform the anode initialization operation three times in the second hold period HP, and may perform the anode initialization operation four times in the third hold period HP. Accordingly, in the scan period SP, the first hold period HP, the second hold period HP and the third hold period HP, the time during which each pixel PX performs the anode initialization operation may gradually increase, and a discharging degree of the parasitic capacitor of the light emitting element EL may gradually increase.

If the time during which each pixel PX performs the anode initialization operation may gradually increase in the hold periods HP, the discharging degree of the parasitic capacitor of the light emitting element EL by the anode initialization operation may gradually increase in the hold periods HP, a current amount required for charging the discharged parasitic capacitor may gradually increase in the hold periods HP, and thus a time point at which each pixel PX starts to emit light may be gradually delayed in the hold periods HP. FIG. 9 illustrates a light waveform LUM2' of the display panel 100 where the time during which each pixel PX performs the anode initialization operation is gradually increased in the hold periods HP. As illustrated in FIG. 9, a time point at which the display panel 110 (or each pixel PX of the display panel 110) starts to emit light may be delayed by a first delay time D1 in the first hold period HP, a time point at which the display panel 110 starts to emit light may be delayed by a second delay time D2 greater than the first delay time D1 in the second hold period HP, and a time point at which the display panel 110 starts to emit light may be delayed by a third delay time D3 greater than the second delay time D2 in the third hold period HP. Accordingly, even if the distortion of the data voltage VDAT caused by the leakage current of each pixel PX may be accumulated in the hold periods HP, since the time point at which each pixel PX starts to emit light may be gradually delayed as the hold periods HP continue, the luminance increase of the display panel 110 in the hold period HP may be prevented or reduced, and the luminance difference between the different driving frequencies DF may be prevented or reduced. For example, as illustrated in FIG. 9, the light waveform LUM2' of the display panel 110 driven at the driving frequency of about 60 Hz may be substantially the same as the light waveform LUM1 of the display panel 110 driven at the driving frequency of about 240 Hz. In some embodiments, the anode initialization voltage VAINT may be set corresponding to a sum of the power supply voltage ELVSS and a threshold voltage of the light emitting element EL. In this case, each pixel PX may start to emit light without delay in the scan period, and a luminance decreased effect by an emission start time point delay may be intensified in the hold period HP.

As described above, in the display device 100 according to embodiments, the time during which each pixel PX performs the anode initialization operation in the hold period HP may be longer than the time during which each pixel PX performs the anode initialization operation in the scan period SP. In some embodiments, the display device 100 may gradually increase the number of applying the anode initialization signal GB to each pixel PX in the hold periods HP. Accordingly, the luminance increase in the hold period HP may be prevented or reduced, and the luminance difference between the different driving frequencies DF may be prevented or reduced.

Figure 10:
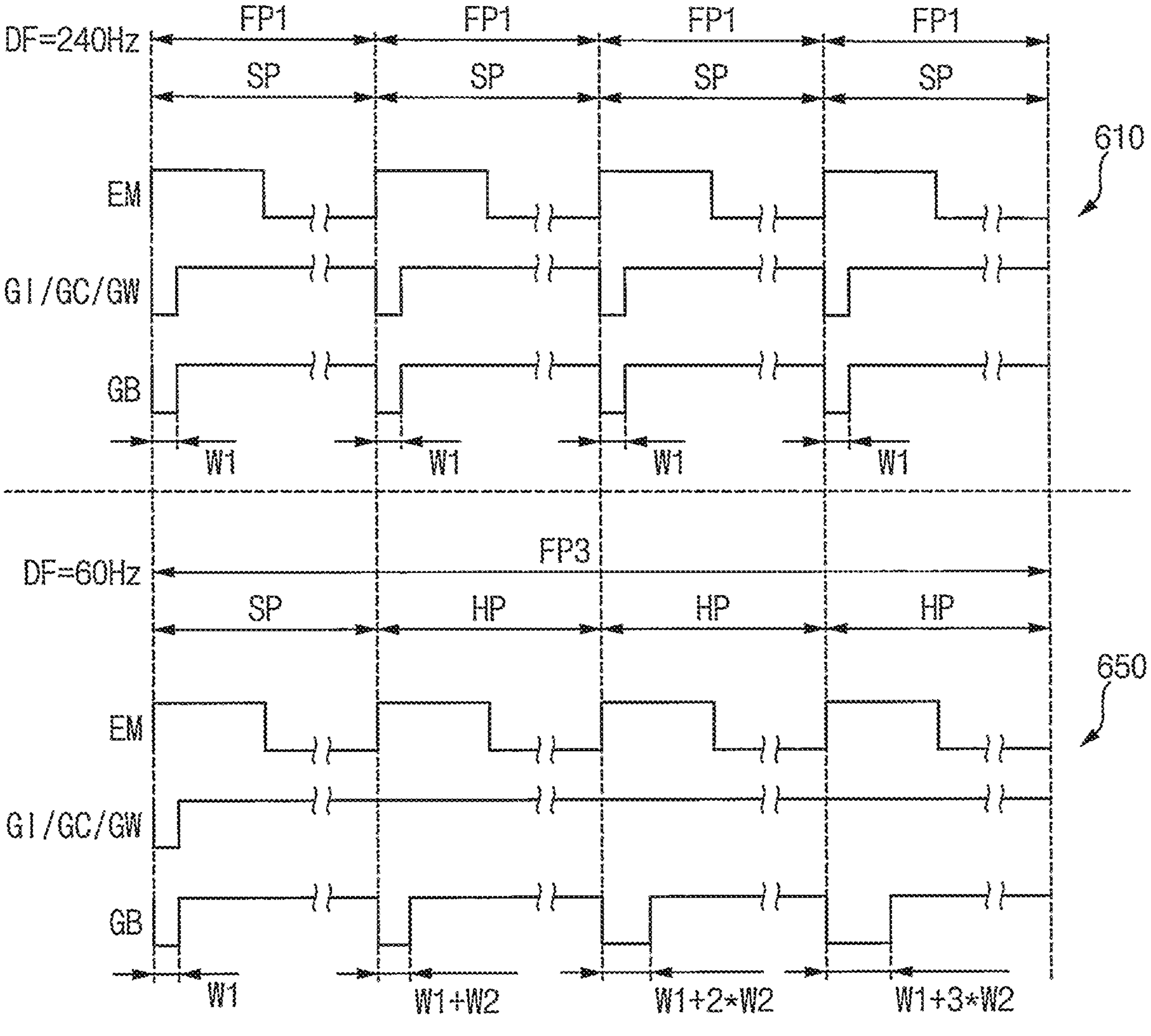
FIG. 10 is a timing diagram for describing examples of an operation of a display device according to embodiments.

FIG. 10 is a timing diagram for describing examples of an operation of a display device according to embodiments.

Referring to FIGS. 1 and 10, in a display device 100 according to embodiments, to gradually increase a time during which an anode initialization operation is performed in hold periods HP, a panel driver 120 may gradually increase a width of an anode initialization signal GB applied to each pixel PX in the hold periods HP.

In some embodiments, a frame period corresponding to N times of a minimum frame period may be divided into one scan period SP and N−1 hold periods HP, and the panel driver 120 may apply the anode initialization signal GB having a first width W1 to each pixel PX in a scan period SP, and may increase the width of the anode initialization signal GB applied to each pixel PX by a second width W2 in each of the N−1 hold periods HP. For example, as illustrated as a first timing diagram 610 of FIG. 10, in a case where a driving frequency DF is about 240 Hz, each frame period FP1 may be set as the scan period SP, and the panel driver 120 may apply the anode initialization signal GB having the first width W1 to each pixel PX in each scan period SP. Alternatively, as illustrated as a second timing diagram 650 of FIG. 10, in a case where the driving frequency DF is about 60 Hz, each frame period FP3 may be divided into the scan period SP and first through third hold periods HP. In this case, the panel driver 120 may apply the anode initialization signal GB having the first width W1 to each pixel PX in the scan period SP, may apply the anode initialization signal GB having a width corresponding to a sum W1+W2 of the first width W1 and the second width W2 to each pixel PX in the first hold period HP, may apply the anode initialization signal GB having a width corresponding to a sum W1+2*W2 of the first width W1 and two times of the second width W2 to each pixel PX in the second hold period HP, and may apply the anode initialization signal GB having a width corresponding to a sum W1+3*W2 of the first width W1 and three times of the second width W2 to each pixel PX in the third hold period HP. In an example, the first width W1 and the second width W2 may be substantially the same as each other, but the first and second widths W1 and W2 are not limited thereto. In this case, the widths of the anode initialization signal GB in the first, second and third hold periods HP may correspond to about two times, about three times and about four times of the width of the anode initialization signal GB in the scan period SP. Accordingly, in the scan period SP, the first hold period HP, the second hold period HP and the third hold period HP, the time during which each pixel PX performs the anode initialization operation may gradually increase.

As described above, in the display device 100 according to embodiments, the time during which each pixel PX performs the anode initialization operation in the hold period HP may be longer than the time during which each pixel PX performs the anode initialization operation in the scan period SP. In some embodiments, the display device 100 may gradually increase the width of the anode initialization signal GB applied to each pixel PX in the hold periods HP. Accordingly, a luminance increase in the hold period HP may be prevented or reduced, and a luminance difference between different driving frequencies DF may be prevented or reduced.

Figure 11:
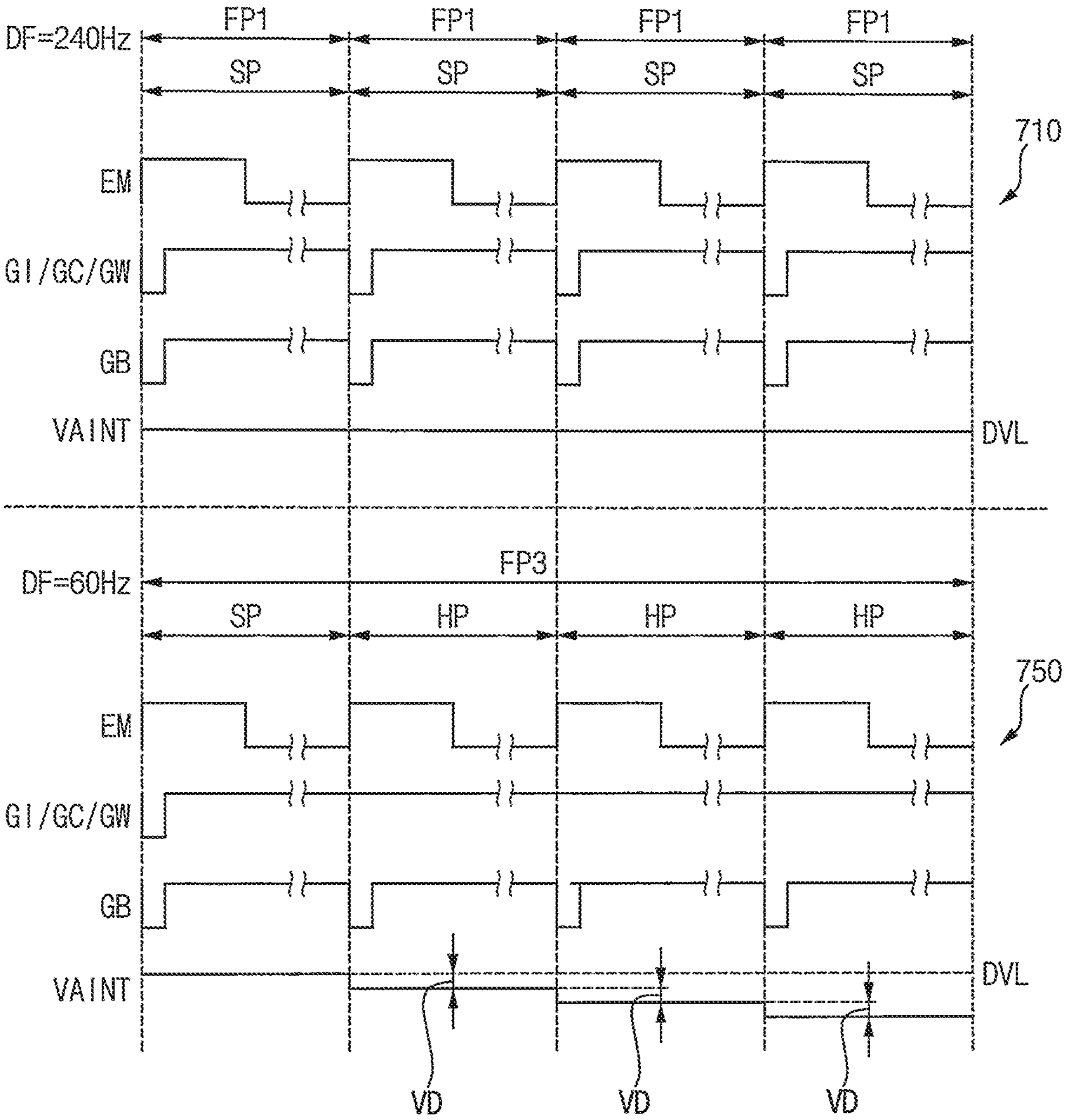
FIG. 11 is a timing diagram for describing examples of an operation of a display device according to embodiments.

FIG. 11 is a timing diagram for describing examples of an operation of a display device according to embodiments.

Referring to FIGS. 1 and 11, in a display device 100 according to embodiments, a voltage level of an anode initialization voltage VAINT used to perform an anode initialization operation in hold periods HP may be different from a voltage level of the anode initialization voltage VAINT in a scan period SP. In some embodiments, a panel driver 120 may gradually decrease the anode initialization voltage VAINT in the hold periods HP.

In some embodiments, a frame period corresponding to N times of a minimum frame period may be divided into one scan period SP and N−1 hold periods HP, and the panel driver 120 may provide the anode initialization voltage VAINT having a default voltage level DVL to each pixel PX, and may decrease the anode initialization voltage VAINT by a predetermined voltage difference VD in each of the N−1 hold periods HP. For example, as illustrated as a first timing diagram 710 of FIG. 11, in a case where a driving frequency DF is about 240 Hz, each frame period FP1 may be set as the scan period SP, and the panel driver 120 may provide the anode initialization voltage VAINT having the default voltage level DVL to each pixel PX. Alternatively, as illustrated as a second timing diagram 750 of FIG. 11, in a case where the driving frequency DF is about 60 Hz, each frame period FP3 may be divided into the scan period SP and first through third hold periods HP. In this case, the panel driver 120 may provide the anode initialization voltage VAINT having the default voltage level DVL to each pixel PX in the scan period SP, may decrease the anode initialization voltage VAINT by the predetermined voltage difference VD in the first hold period HP, may further decrease the anode initialization voltage VAINT by the predetermined voltage difference VD in the second hold period HP, and may further decrease the anode initialization voltage VAINT by the predetermined voltage difference VD in the third hold period HP. Since a discharging degree of a parasitic capacitor of a light emitting element is increased as the voltage level of the anode initialization voltage VAINT is lower, the discharging degree of the parasitic capacitor of the light emitting element by the anode initialization operation may gradually increase in the hold periods HP.

Although FIG. 11 illustrates an example where an anode initialization signal GB having the same width is applied once to each pixel PX in each hold period HP, the anode initialization signal GB in the hold periods HP is not limited to the example of FIG. 11. For example, not only the anode initialization voltage VAINT may be gradually decreased in the hold periods HP, but also the number of applying the anode initialization signal GB may gradually increase in the hold periods HP as illustrated in FIG. 8, and/or a width of the anode initialization signal GB may gradually increase in the hold periods HP as illustrated in FIG. 10.

As described above, in the display device 100 according to embodiments, the voltage level of the anode initialization voltage VAINT in the hold period HP may be different from the voltage level of the anode initialization voltage VAINT in the scan period SP. In some embodiments, the display device 100 may gradually decrease the anode initialization voltage VAINT in the hold periods HP. Accordingly, a luminance increase in the hold period HP may be prevented or reduced, and a luminance difference between different driving frequencies DF may be prevented or reduced.

Figure 12:
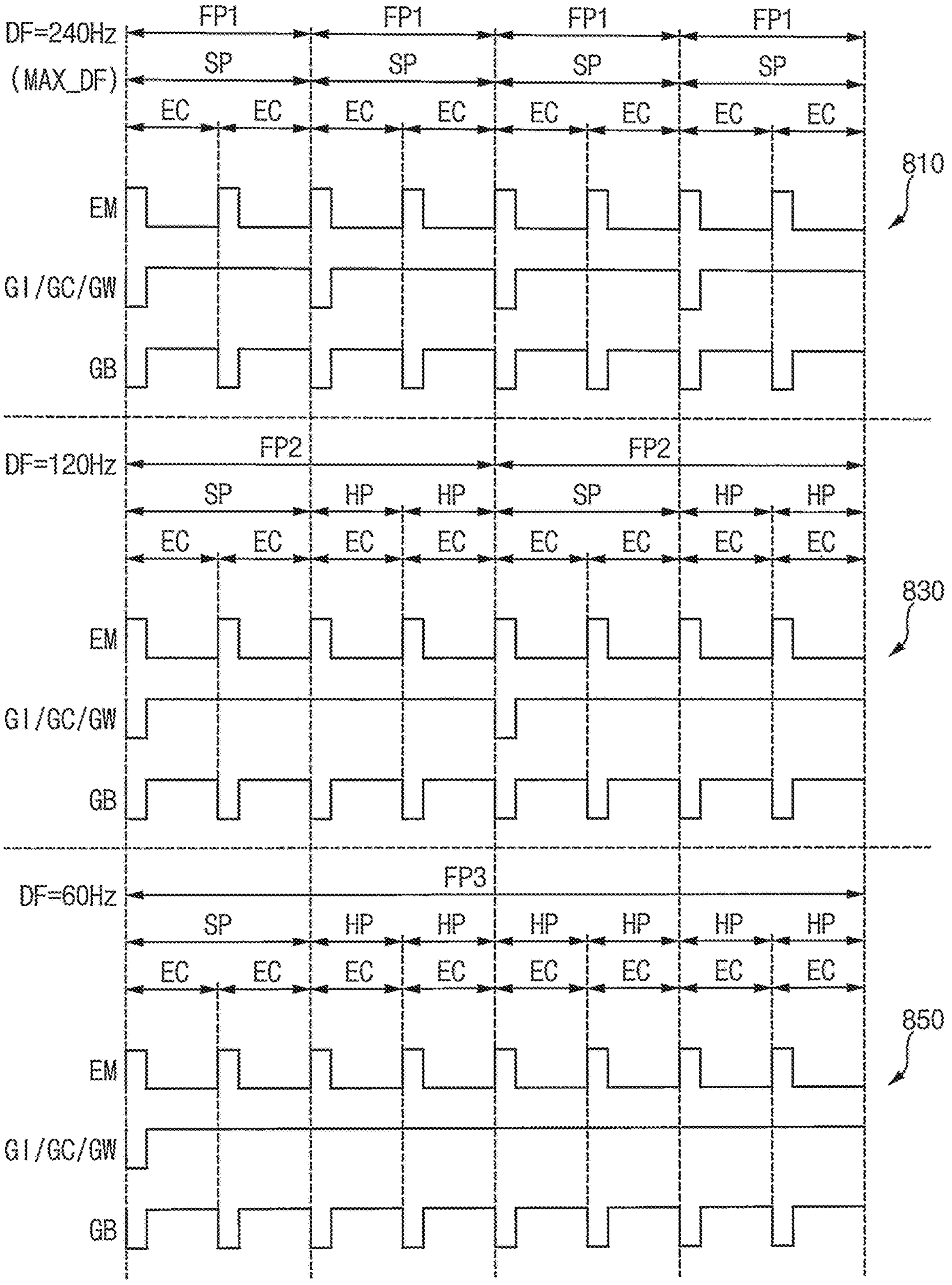
FIG. 12 is a timing diagram for describing examples where a frame period is divided into a scan period and a hold period in a display device according to embodiments.
Figure 13:
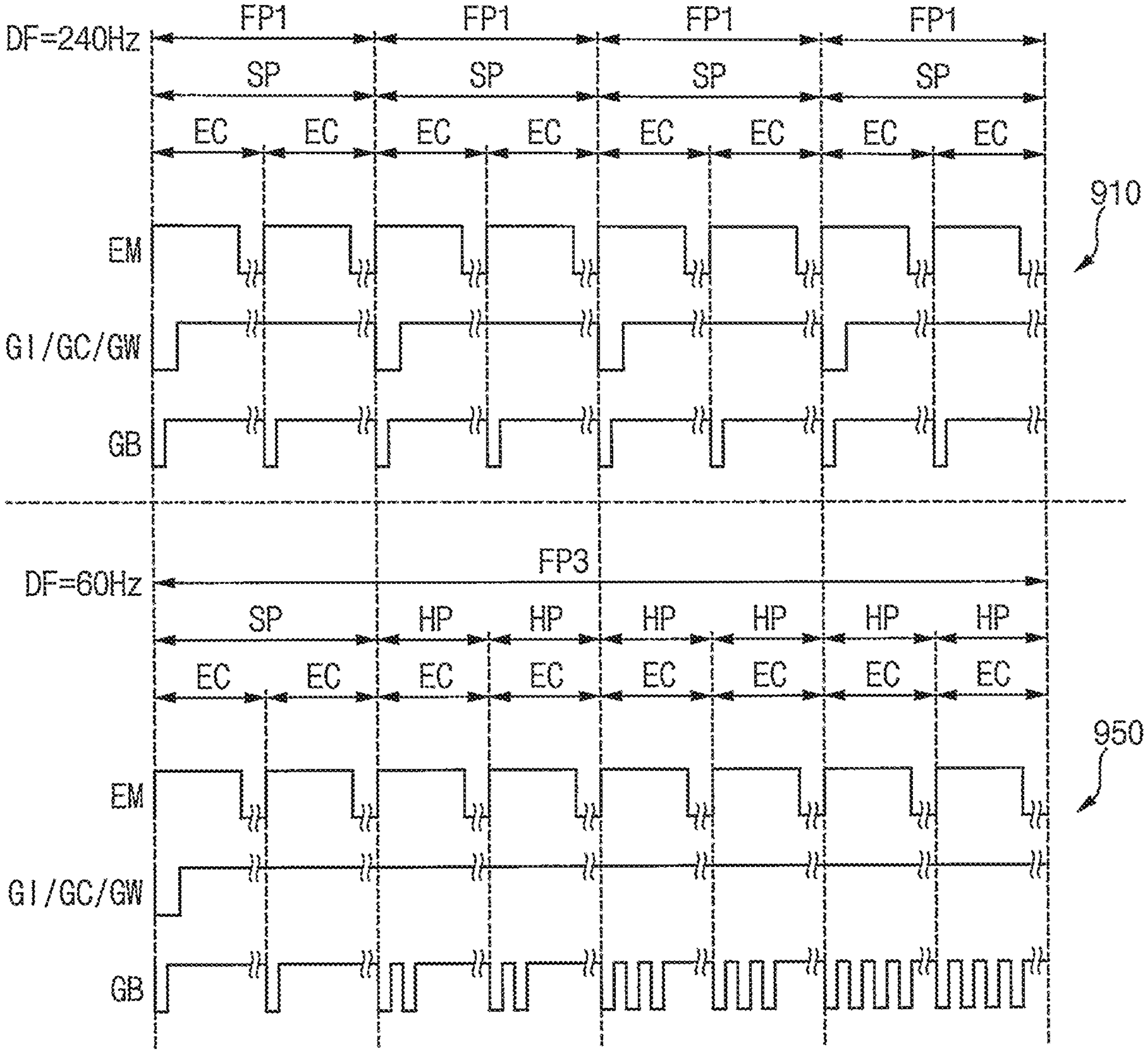
FIG. 13 is a timing diagram for describing examples of an operation of a display device according to embodiments.
Figure 14:
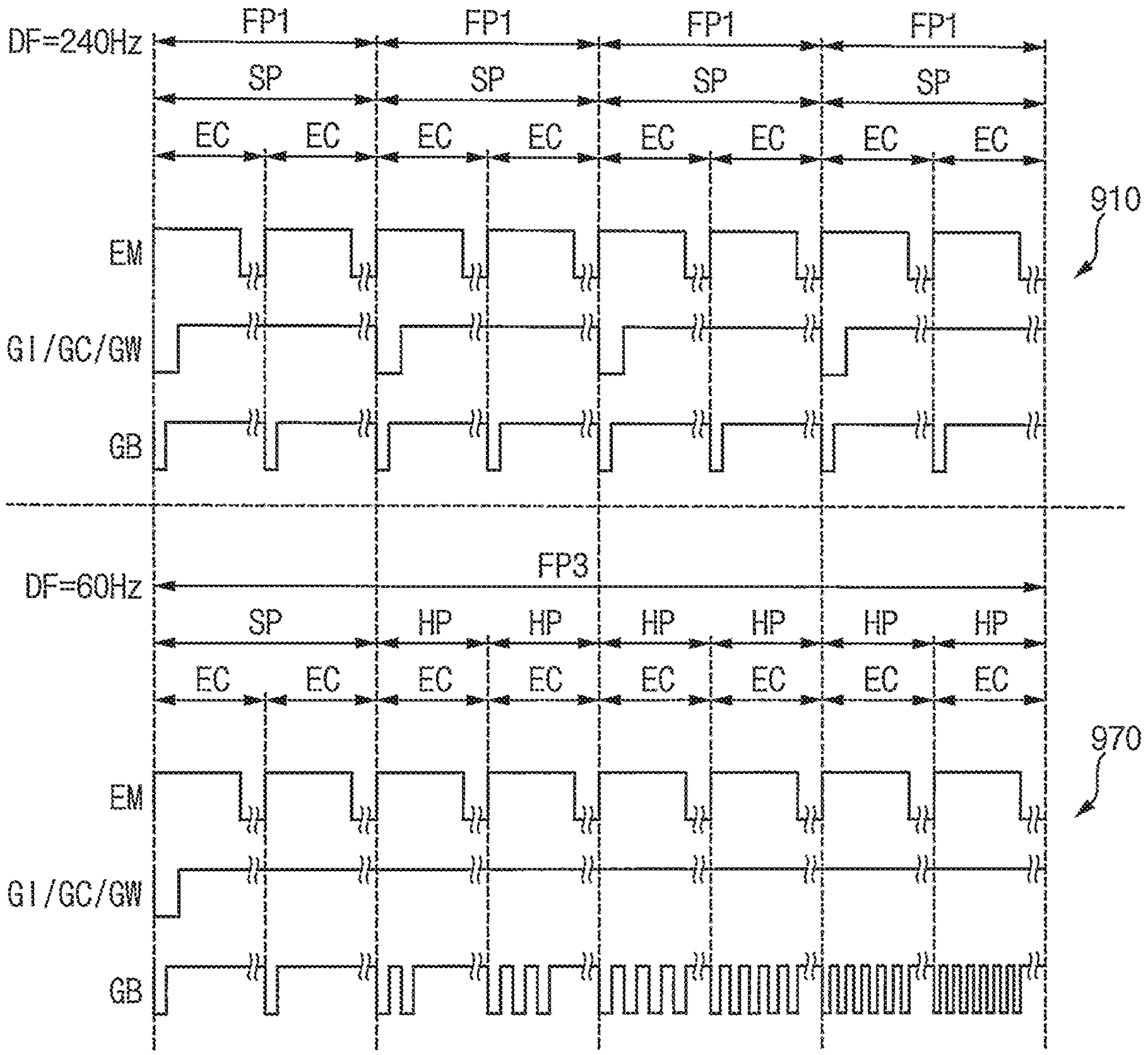
FIG. 14 is a timing diagram for describing examples of an operation of a display device according to embodiments.
Figure 15:
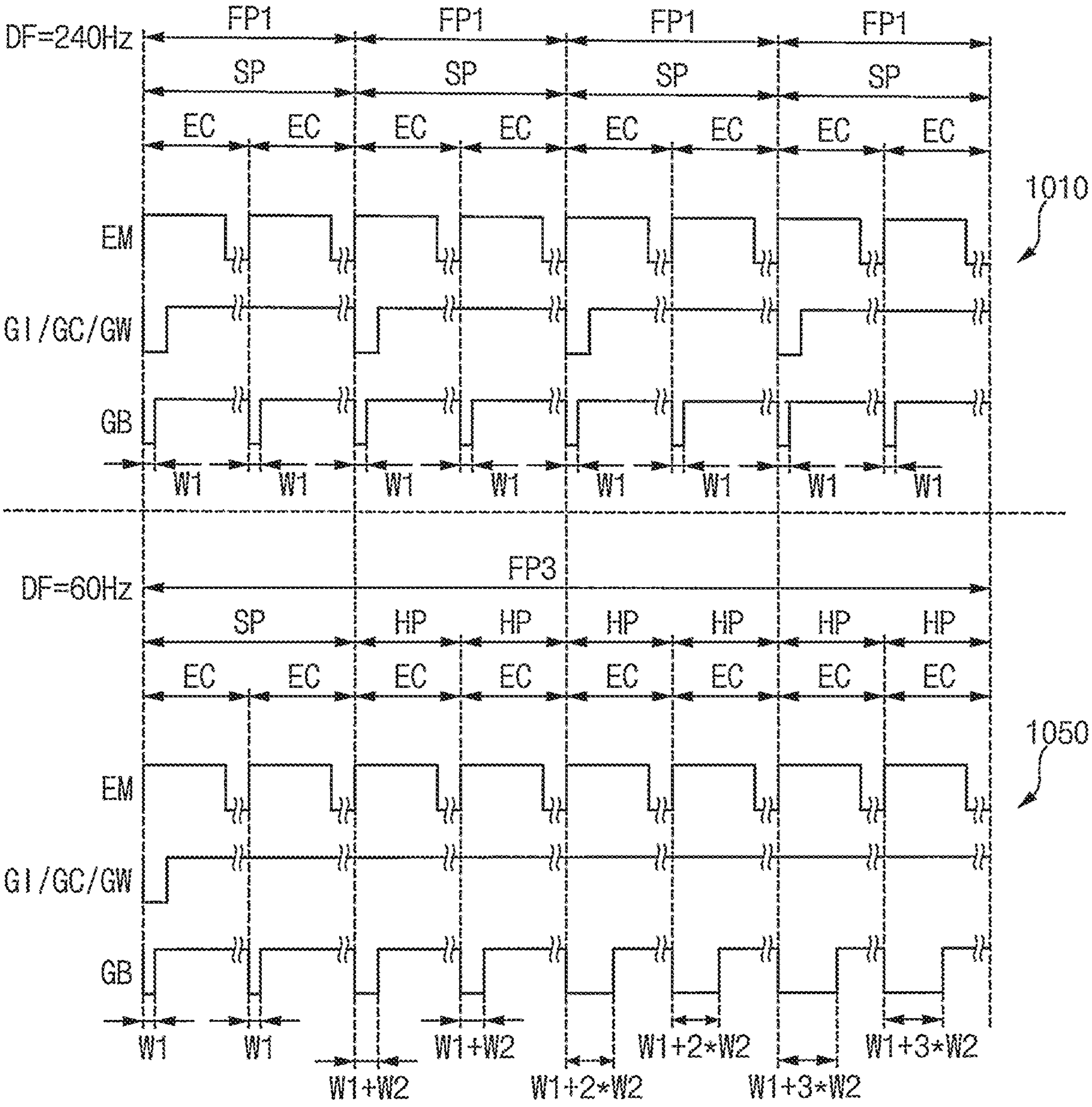
FIG. 15 is a timing diagram for describing examples of an operation of a display device according to embodiments.
Figure 16:
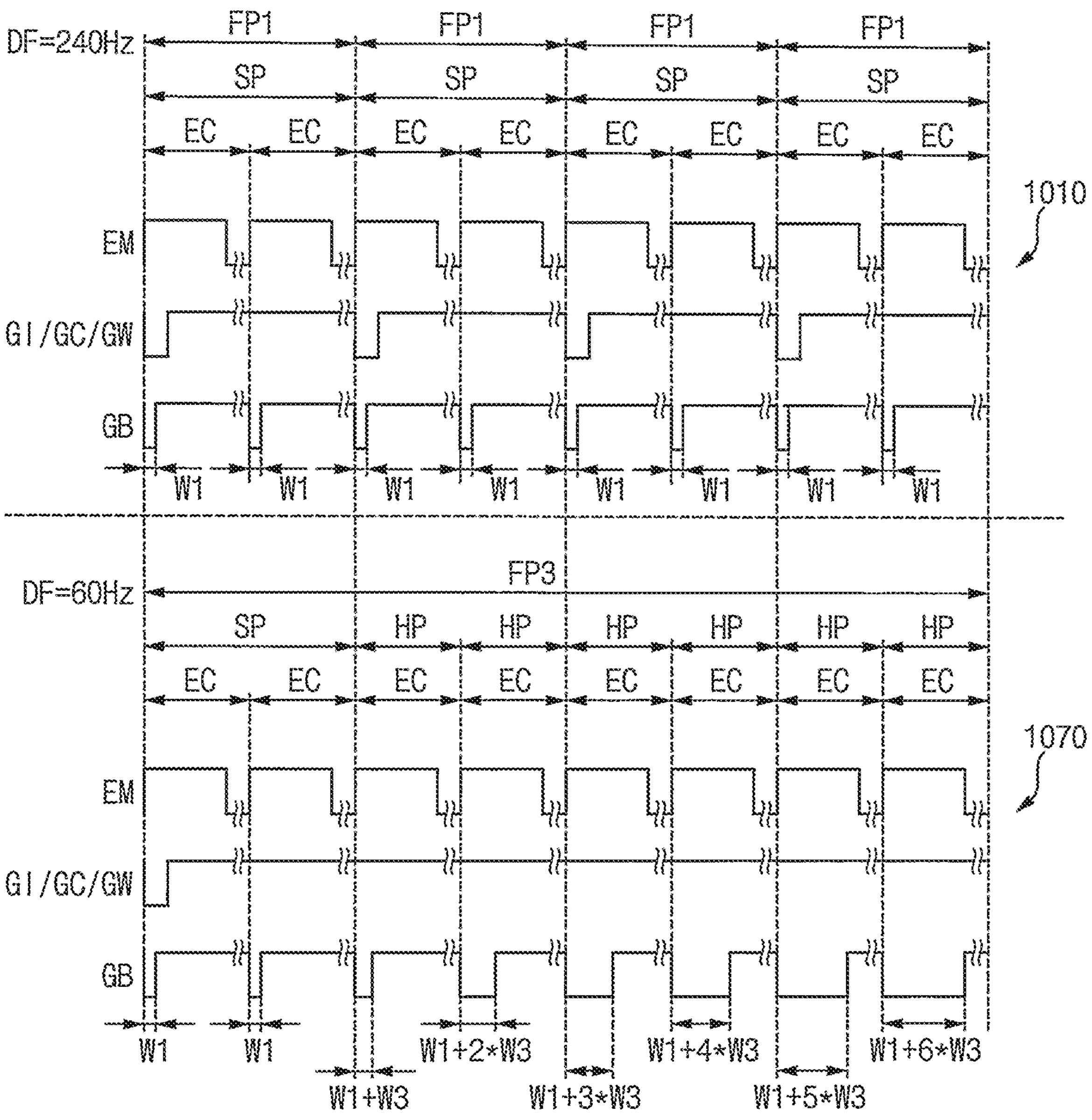
FIG. 16 is a timing diagram for describing examples of an operation of a display device according to embodiments.
Figure 17:
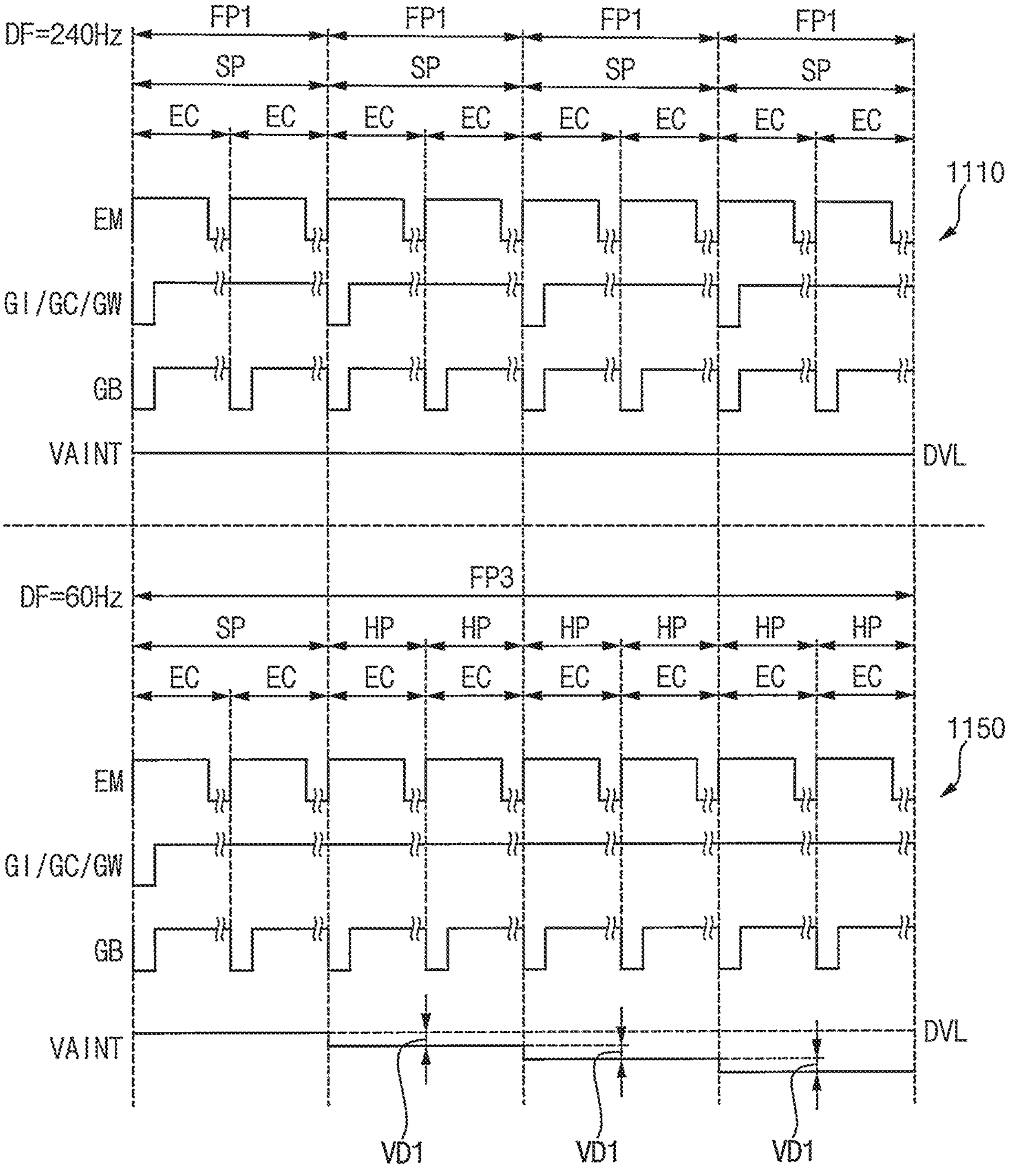
FIG. 17 is a timing diagram for describing examples of an operation of a display device according to embodiments.
Figure 18:
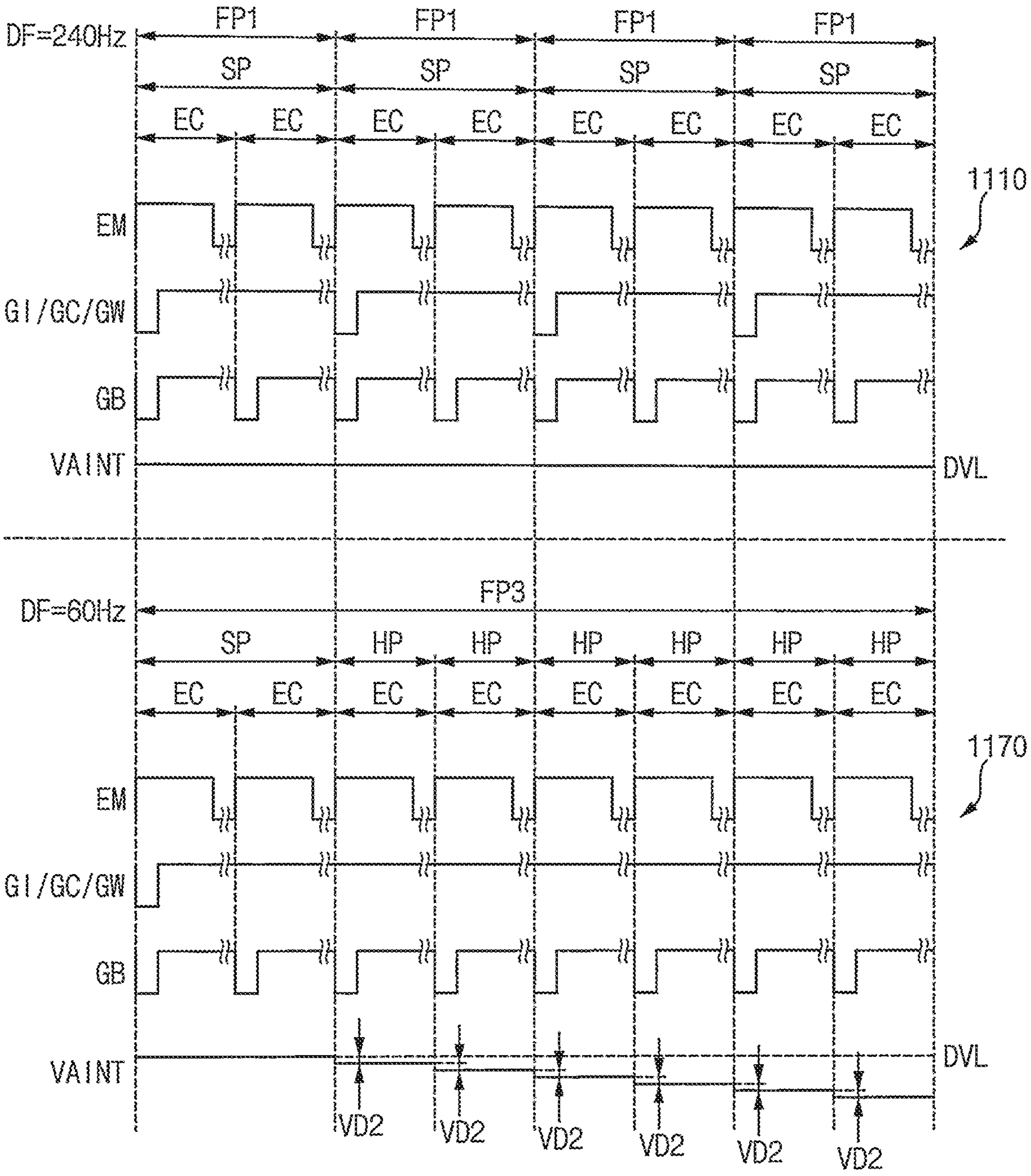
FIG. 18 is a timing diagram for describing examples of an operation of a display device according to embodiments.
Figure 19:
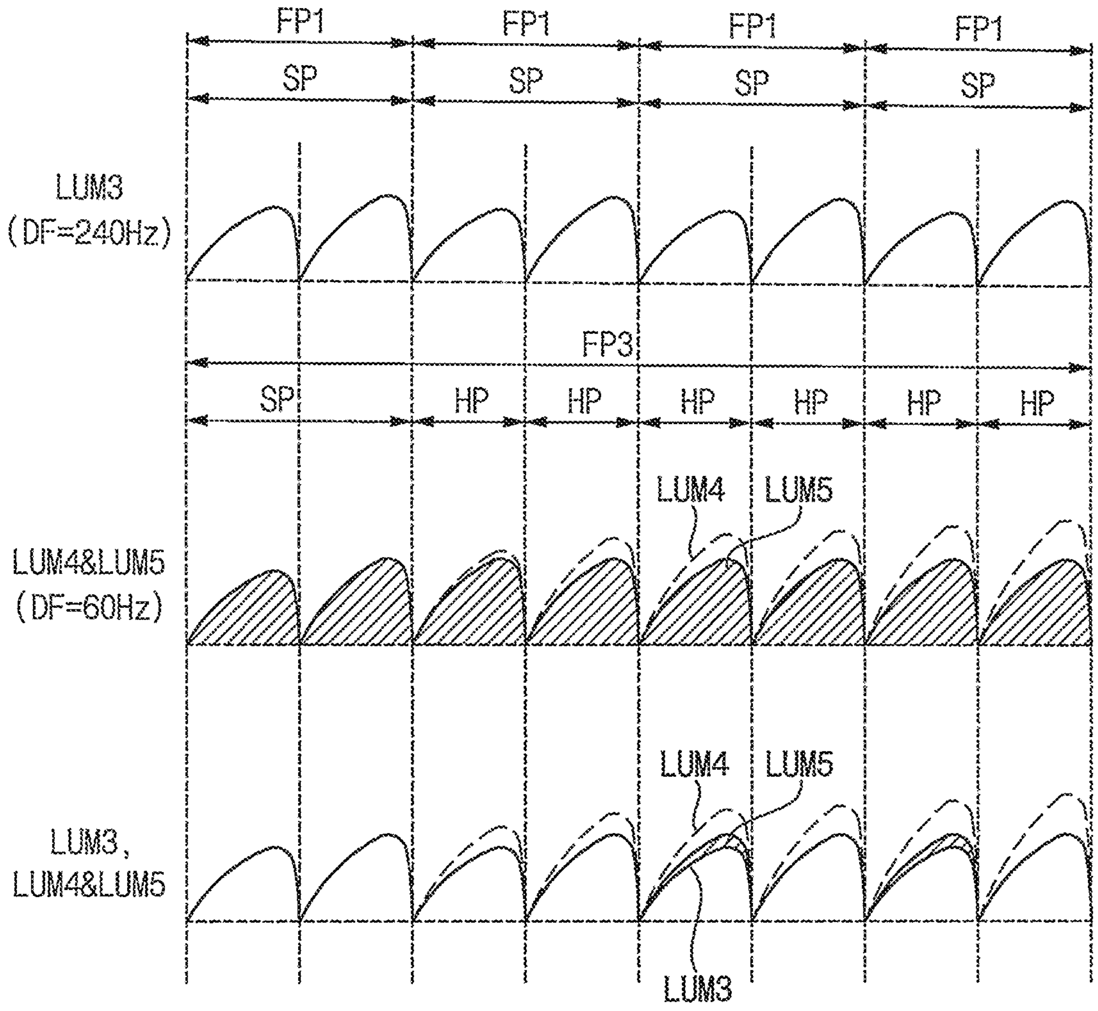
FIG. 19 is a diagram illustrating an example of luminances of a display panel driven at driving frequencies of about 240 Hz and about 60 Hz in a display device according to embodiments.

FIG. 12 is a timing diagram for describing examples where a frame period is divided into a scan period and a hold period in a display device according to embodiments, FIG. 13 is a timing diagram for describing examples of an operation of a display device according to embodiments, FIG. 14 is a timing diagram for describing examples of an operation of a display device according to embodiments, FIG. 15 is a timing diagram for describing examples of an operation of a display device according to embodiments, FIG. 16 is a timing diagram for describing examples of an operation of a display device according to embodiments, FIG. 17 is a timing diagram for describing examples of an operation of a display device according to embodiments, FIG. 18 is a timing diagram for describing examples of an operation of a display device according to embodiments, and FIG. 19 is a diagram illustrating an example of luminances of a display panel driven at driving frequencies of about 240 Hz and about 60 Hz in a display device according to embodiments.

Referring to FIGS. 1 and 12, in a display device 100 according to embodiments, a panel driver 120 may determine a frame period for a display panel 110 according to a variable frame frequency IFF such that a time length of the frame period corresponds to M times of an emission cycle EC (or an emission period), where M is an integer greater than 0. Here, the emission cycle EC may be a period of an emission signal EM, and may be shorter than a minimum frame period. For example, a maximum driving frequency MAX_DF for the display panel 110 may be about 240 Hz, a frequency of the emission signal EM may be about 480 Hz, the minimum frame period may have a time length of about 4.2 ms, and the emission cycle EC may have, but not limited to, a time length of about 2.1 ms corresponding to a half of the minimum frame period. In some embodiments, a host processor may provide input image data IDAT to the panel driver 120 at one of discrete variable frame frequencies IFF corresponding to M times of the emission cycle EC. In this case, the panel driver 120 may determine a driving frequency DF for the display panel 110 substantially the same as the variable frame frequency IFF such that the frame period for the display panel 110 may have a time length corresponding to the variable frame frequency IFF. In other embodiments, the host processor may provide the input image data IDAT to the panel driver 120 at a continuous variable frame frequency IFF. In this case, the panel driver 120 may select the driving frequency DF close to the variable frame frequency IFF from among discrete driving frequencies DF corresponding to M times of the emission cycle EC, and may determine the frame period corresponding to the selected driving frequency DF.

Further, the panel driver 120 may divide the frame period corresponding to M times of the emission cycle EC into a scan period SP having a time length corresponding to L times of the emission cycle EC, and M-L hold periods HP each having a time length corresponding to the time length of the emission cycle EC, where L is an integer greater than 0 and less than or equal to M. The panel driver 120 may apply an anode initialization signal GB to each pixel PX in each emission cycle EC, and each pixel PX may perform an anode initialization operation in response to the anode initialization signal GB in each emission cycle EC. Thus, each pixel PX may periodically perform the anode initialization operation regardless of the driving frequency DF.

FIG. 12 illustrates examples where the maximum driving frequency MAX_DF is about 240 Hz, and the emission cycle EC corresponds to a frequency of about 480 Hz. For example, as illustrated as a first timing diagram 810 of FIG. 12, in a case where the driving frequency DF is about 240 Hz, the panel driver 120 may set each frame period FP1 as a scan period SP corresponding to two emission cycles EC. Further, as illustrated as a second timing diagram 830 of FIG. 12, in a case where the driving frequency DF is about 120 Hz, the panel driver 120 may divide each frame period FP2 into one scan period SP corresponding to two emission cycles EC and two hold periods HP each corresponding to one emission cycle EC. Further, as illustrated as a third timing diagram 850 of FIG. 12, in a case where the driving frequency DF is about 60 Hz, the panel driver 120 may divide each frame period FP2 into one scan period SP corresponding to two emission cycles EC and six hold periods HP each corresponding to one emission cycle EC. In each emission cycle EC, the panel driver 120 may apply the emission signal EM and the anode initialization signal GB to each pixel PX, and each pixel PX may perform the anode initialization operation in response to the anode initialization signal GB.

Further, in the display device 100 according to embodiments, to prevent or reduce a luminance increase in the hold period HP, or a luminance difference between different driving frequencies DF, a discharging degree of a parasitic capacitor of a light emitting element by the anode initialization operation may gradually increase in the hold periods HP.

In some embodiments, the panel driver 120 may increase the number of applying the anode initialization signal GB to each pixel PX by one per L hold periods HP of the M-L hold periods HP. Although FIGS. 12 through 19 illustrate examples where Lis 2, L is not limited to 2. For example, as illustrated as a first timing diagram 910 of FIG. 13, in a case where the driving frequency DF is about 240 Hz, the panel driver 120 may apply the anode initialization signal GB once to each pixel PX in each emission cycle EC of the scan period SP, and each pixel PX may perform the anode initialization operation once in each emission cycle EC. Alternatively, as illustrated as a second timing diagram 950 of FIG. 13, in a case where the driving frequency DF is about 60 Hz, the panel driver 120 may apply the anode initialization signal GB once to each pixel PX in each emission cycle EC of the scan period SP, may apply the anode initialization signal GB two times to each pixel PX in each of first and second hold periods HP, may apply the anode initialization signal GB three times to each pixel PX in each of third and fourth hold periods HP, and may apply the anode initialization signal GB four times to each pixel PX in each of fifth and sixth hold periods HP. Thus, each pixel PX may perform the anode initialization operation once in each emission cycle EC of the scan period SP, may perform the anode initialization operation two times in each of the first and second hold periods HP, may perform the anode initialization operation three times in each of the third and fourth hold periods HP, and may perform the anode initialization operation four times in each of the fifth and sixth hold periods HP. Accordingly, a time during which each pixel PX performs the anode initialization operation may gradually increase, and the discharging degree of the parasitic capacitor of the light emitting element may gradually increase.

In other embodiments, the panel driver 120 may increase the number of applying the anode initialization signal GB to each pixel PX by one in each of the M-L hold periods HP. For example, as illustrated as a timing diagram 970 of FIG. 14, the panel driver 120 may apply the anode initialization signal GB once to each pixel PX in each emission cycle EC of the scan period SP, may apply the anode initialization signal GB two times to each pixel PX in the first hold period HP, may apply the anode initialization signal GB three times to each pixel PX in the second hold period HP, may apply the anode initialization signal GB four times to each pixel PX in the third hold period HP, may apply the anode initialization signal GB five times to each pixel PX in the fourth hold period HP, may apply the anode initialization signal GB six times to each pixel PX in the fifth hold period HP, and may apply the anode initialization signal GB seven times to each pixel PX in the sixth hold period HP. Accordingly, the time during which each pixel PX performs the anode initialization operation may gradually increase, and the discharging degree of the parasitic capacitor of the light emitting element may gradually increase.

In still other embodiments, the panel driver 120 may increase a width of the anode initialization signal GB by a second width W2 per L hold periods HP of the M-L hold periods HP. For example, as illustrated as a first timing diagram 1010 of FIG. 15, in a case where the driving frequency DF is about 240 Hz, the panel driver 120 may apply the anode initialization signal GB having a first width W1 to each pixel PX in each emission cycle EC of the scan period SP. Alternatively, as illustrated as a second timing diagram 1050 of FIG. 15, in a case where the driving frequency DF is about 60 Hz, the panel driver 120 may apply the anode initialization signal GB having the first width W1 to each pixel PX in each emission cycle EC of the scan period SP, may apply the anode initialization signal GB having a width corresponding to a sum W1+W2 of the first width W1 and the second width W2 to each pixel PX in each of the first and second hold periods HP, may apply the anode initialization signal GB having a width corresponding to a sum W1+2*W2 of the first width W1 and two times of the second width W2 to each pixel PX in each of the third and fourth hold periods HP, and may apply the anode initialization signal GB having a width corresponding to a sum W1+3*W2 of the first width W1 and three times of the second width W2 to each pixel PX in each of the fifth and sixth hold periods HP. Accordingly, the time during which each pixel PX performs the anode initialization operation may gradually increase, and the discharging degree of the parasitic capacitor of the light emitting element may gradually increase.

In still other embodiments, the panel driver 120 may increase the width of the anode initialization signal GB by a third width W3 in each of the M-L hold periods HP. For example, as illustrated as a timing diagram 1070 of FIG. 16, the panel driver 120 may apply the anode initialization signal GB having the first width W1 to each pixel PX in each emission cycle EC of the scan period SP, may apply the anode initialization signal GB having a width corresponding to a sum W1+W3 of the first width W1 and the third width W3 to each pixel PX in the first hold period HP, may apply the anode initialization signal GB having a width corresponding to a sum W1+2*W3 of the first width W1 and two times of the third width W3 to each pixel PX in the second hold period HP, may apply the anode initialization signal GB having a width corresponding to a sum W1+3*W3 of the first width W1 and three times of the third width W3 to each pixel PX in the third hold period HP, may apply the anode initialization signal GB having a width corresponding to a sum W1+4*W3 of the first width W1 and four times of the third width W3 to each pixel PX in the fourth hold period HP, may apply the anode initialization signal GB having a width corresponding to a sum W1+5*W3 of the first width W1 and five times of the third width W3 to each pixel PX in the fifth hold period HP, and may apply the anode initialization signal GB having a width corresponding to a sum W1+6*W3 of the first width W1 and six times of the third width W3 to each pixel PX in the sixth hold period HP. For example, the second width W2 may be substantially the same as the first width W1, and the third width W3 may correspond to a half of the first width W1 or the second width W2. However, the first, second and third widths are not limited thereto. Accordingly, the time during which each pixel PX performs the anode initialization operation may gradually increase, and the discharging degree of the parasitic capacitor of the light emitting element may gradually increase.

In still other embodiments, the panel driver 120 may decrease an anode initialization voltage VAINT by a first voltage difference VD1 per L hold periods HP of the M-L hold periods HP. For example, as illustrated as a first timing diagram 1110 of FIG. 17, in a case where the driving frequency DF is about 240 Hz, the panel driver 120 may provide the anode initialization voltage VAINT having a default voltage level DVL to each pixel PX in the scan period SP. Alternatively, as illustrated as a second timing diagram 1150 of FIG. 17, in a case where the driving frequency DF is about 60 Hz, the panel driver 120 may provide the anode initialization voltage VAINT having the default voltage level DVL to each pixel PX in the scan period SP, may decrease the anode initialization voltage VAINT by the first voltage difference VD1 in the first and second hold periods HP, may further decrease the anode initialization voltage VAINT by the first voltage difference VD1 in the third and fourth hold periods HP, and may further decrease the anode initialization voltage VAINT by the first voltage difference VD1 in the fifth and sixth hold periods HP. Accordingly, the discharging degree of the parasitic capacitor of the light emitting element by the anode initialization operation may gradually increase in the hold periods HP.

In still other embodiments, the panel driver 120 may decrease the anode initialization voltage VAINT by a second voltage difference VD2 in each of the M-L hold periods HP.

For example, as illustrated as a timing diagram 1170 of FIG. 18, the panel driver 120 may provide the anode initialization voltage VAINT having the default voltage level DVL to each pixel PX in the scan period SP, and may decrease the anode initialization voltage VAINT by the second voltage difference VD2 in each of the first through sixth hold periods HP. For example, the second voltage difference VD2 may correspond to, but not limited to, a half of the first voltage difference VD1. Accordingly, the discharging degree of the parasitic capacitor of the light emitting element by the anode initialization operation may gradually increase in the hold periods HP.

FIG. 19 illustrates a light waveform LUM3 of the display panel 110 driven at the driving frequency of about 240 Hz and light waveforms LUM4 & LUM5 of the display panel 110 driven at the driving frequency of about 60 Hz. In FIG. 19, LUM4 represents a light waveform of the display panel 110 where the discharging degree of the parasitic capacitor of the light emitting element is uniform in the hold periods HP, and LUM5 represents a light waveform of the display panel 110 where the discharging degree of the parasitic capacitor of the light emitting element is gradually increased in the hold periods HP according to embodiments. In the display device 100 according to embodiments, a time point at which the display panel 110 (or each pixel PX of the display panel 110) starts to emit light may be gradually delayed in the hold periods HP, a luminance increase of the display panel 110 in the hold period HP may be prevented or reduced, and a luminance difference between different driving frequencies DF may be prevented or reduced. For example, as illustrated in FIG. 19, an area of the light waveform LUM5 of the display panel 110 driven at the driving frequency of about 60 Hz may be substantially the same as an area of the light waveform LUM3 of the display panel 110 driven at the driving frequency of about 240 Hz.

Figure 20:
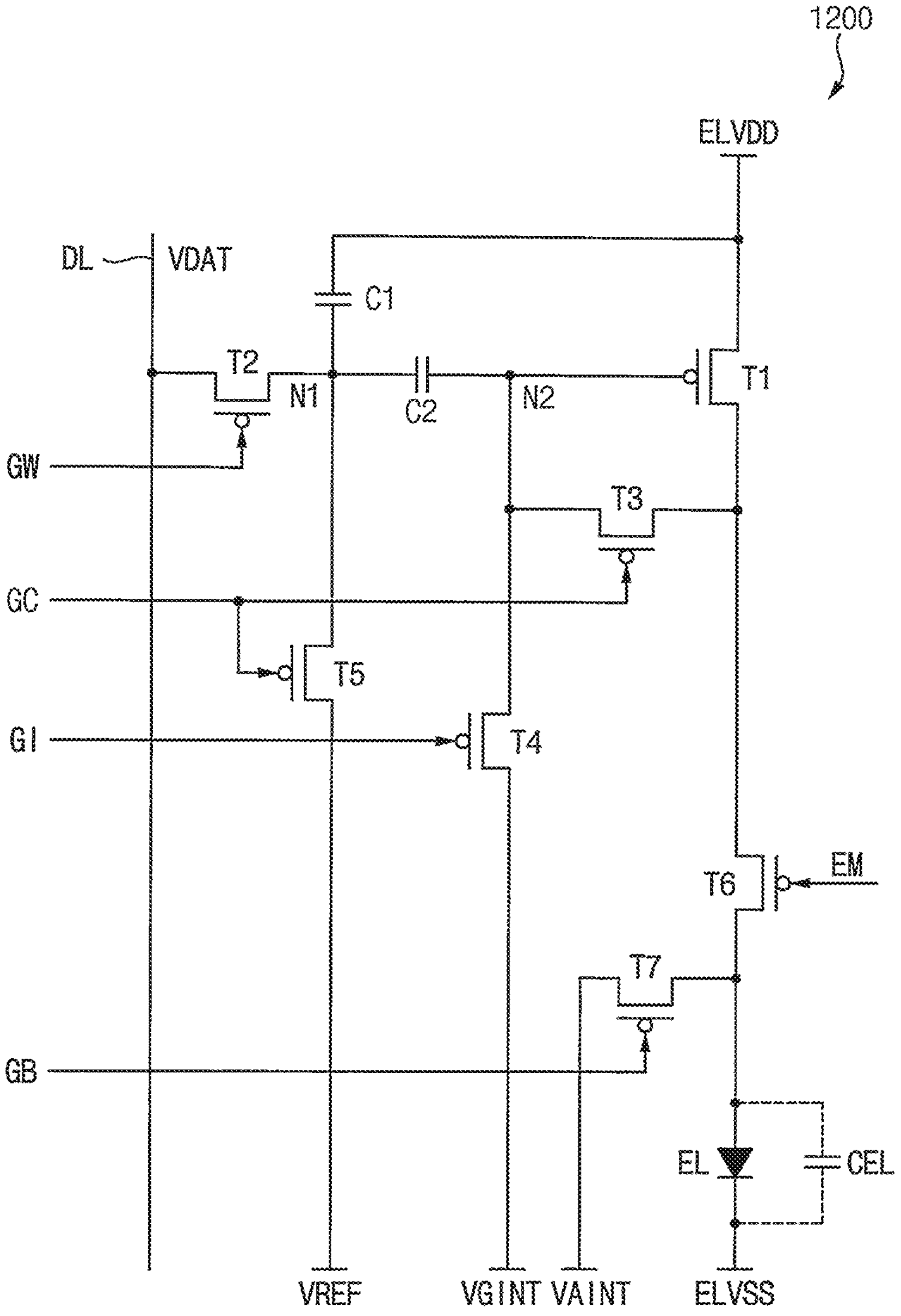
FIG. 20 is a circuit diagram illustrating a pixel according to embodiments.
Figure 21:
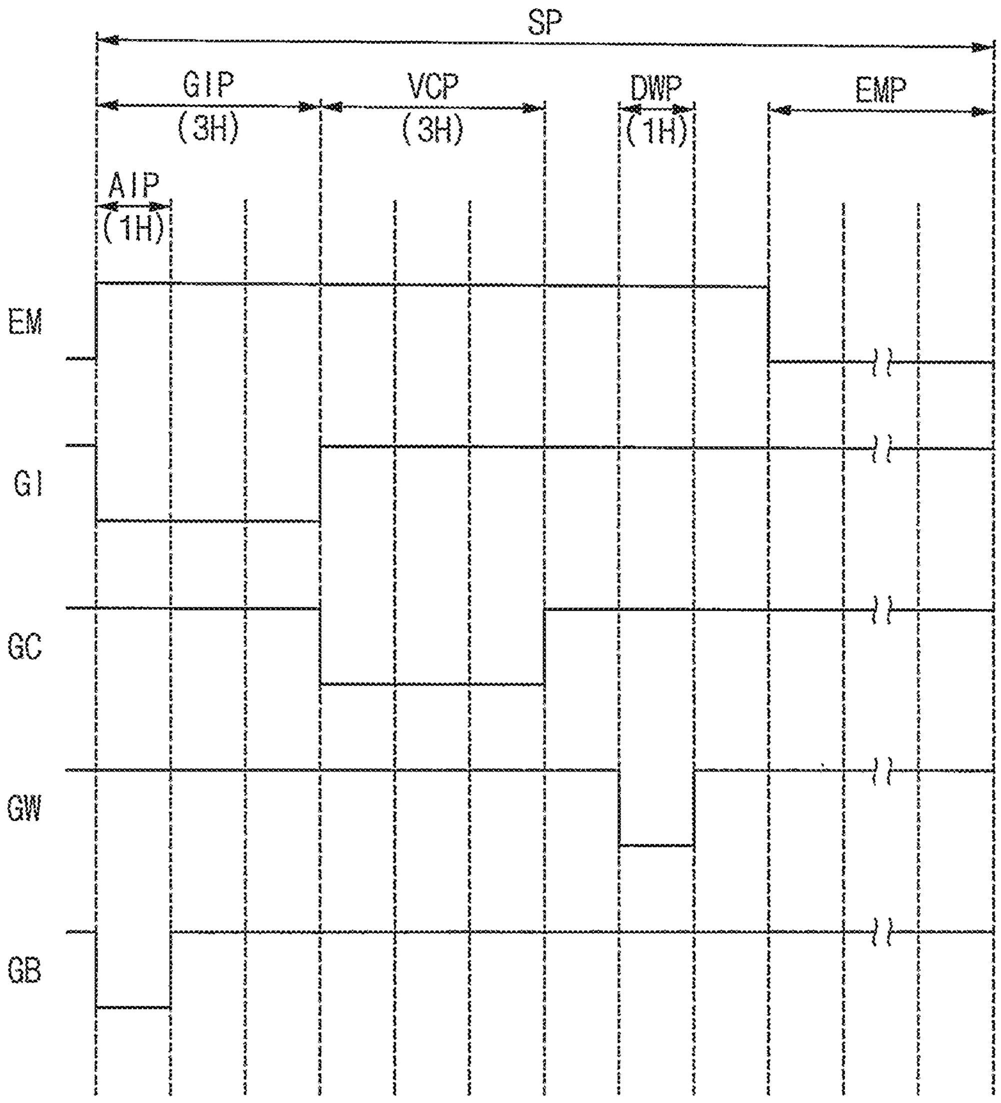
FIG. 21 is a timing diagram for describing an example of an operation of a pixel of FIG. 20 in a scan period.
Figure 22:
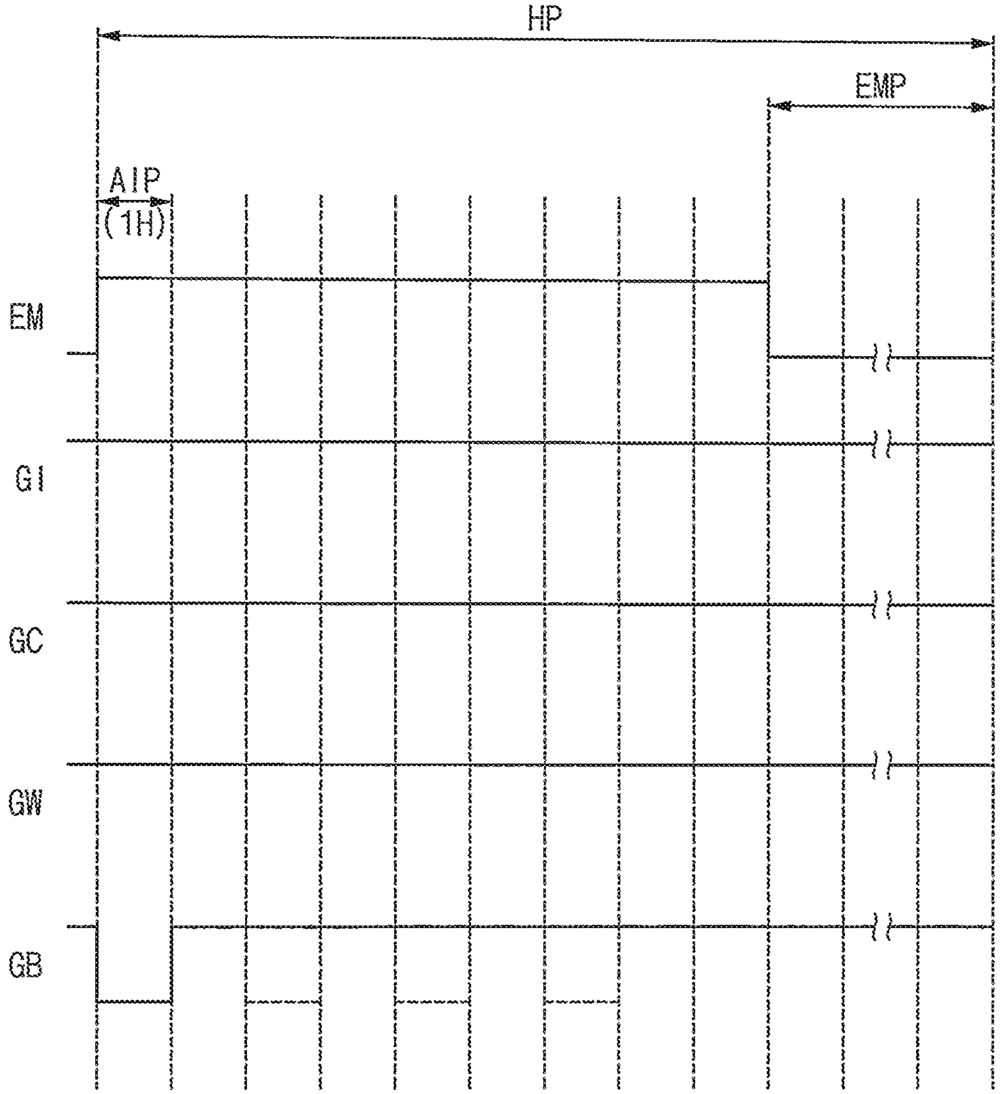
FIG. 22 is a timing diagram for describing an example of an operation of a pixel of FIG. 20 in a hold period.

FIG. 20 is a circuit diagram illustrating a pixel according to embodiments, FIG. 21 is a timing diagram for describing an example of an operation of a pixel of FIG. 20 in a scan period, and FIG. 22 is a timing diagram for describing an example of an operation of a pixel of FIG. 20 in a hold period.

Referring to FIG. 20, a pixel 1200 according to embodiments may include a first capacitor C1, a second capacitor C2, a first transistor T1, a second transistor T2, a third transistor T3, a fourth transistor T4, a fifth transistor T5, a sixth transistor T6, a seventh transistor T7, and a light emitting element EL.

The first capacitor C1 may be coupled between a line of a first power supply voltage ELVDD (e.g., a high power supply voltage) and a first node N1. In some embodiments, the first capacitor C1 may include a first electrode coupled to the line of the first power supply voltage ELVDD, and a second electrode coupled to the first node N1.

The second capacitor C2 may be coupled between the first node N1 and a second node N2. In some embodiments, the second capacitor C2 may include a first electrode coupled to the first node N1, and a second electrode coupled to the second node N2.

The first transistor T1 may generate a driving current based on a voltage of the second node N2, or a voltage of the second electrode of the second capacitor C2. In some embodiments, the first transistor T1 may include a gate coupled to the second node N2, a first terminal coupled to the line of the first power supply voltage ELVDD, and a second terminal coupled to the third and sixth transistors T3 and T6.

The second transistor T2 may transfer a data voltage VDAT of a data line DL to the first node N1 in response to a writing signal GW. In some embodiments, the second transistor T2 may include a gate receiving the writing signal GW, a first terminal coupled to the first node N1, and a second terminal coupled to the data line DL.

The third transistor T3 may diode-connect the first transistor T1 in response to a compensation signal GC. In some embodiments, the third transistor T3 may include a gate receiving the compensation signal GC, a first terminal coupled to the second terminal of the first transistor T1, and a second terminal coupled to the second node N2.

The fourth transistor T4 may apply a gate initialization voltage VGINT to the second node N2 in response to a gate initialization signal GI. In some embodiments, the fourth transistor T4 may include a gate receiving the gate initialization voltage VGINT, a first terminal coupled to the second node N2, and a second terminal coupled to a line of the gate initialization voltage VGINT.

The fifth transistor T5 may apply a reference voltage VREF to the first node N1 in response to the compensation signal GC. In some embodiments, the fifth transistor T5 may include a gate receiving the compensation signal GC, a first terminal coupled to a line of the reference voltage VREF, and a second terminal coupled to the first node N1.

The sixth transistor T6 may couple the first transistor T1 and the light emitting element EL in response to an emission signal EM. In some embodiments, the sixth transistor T6 may include a gate receiving the emission signal EM, a first terminal coupled to the first transistor T1, and a second terminal coupled to the light emitting element EL.

The seventh transistor T7 may perform an anode initialization operation that applies an anode initialization voltage VAINT to an anode of the light emitting element EL in response to an anode initialization signal GB. In some embodiments, the seventh transistor T7 may be referred to as an anode initialization transistor that performs the anode initialization operation. In some embodiments, as illustrated in FIG. 20, the gate initialization voltage VGINT and the anode initialization voltage VAINT may be different voltages provided to the pixel 1200 through different lines. Further, in some embodiments, the seventh transistor T7 may include a gate receiving the anode initialization signal GB, a first terminal coupled to the anode of the light emitting element EL, and a second terminal coupled to a line of the anode initialization voltage VAINT.

In some embodiments, the first through seventh transistors T1 through T7 may be implemented with, but not limited to, p-type metal oxide semiconductor (PMOS) transistors.

The light emitting element EL may emit light based on the driving current generated by the first transistor T1 while the sixth transistor T6 is turned on. For example, the light emitting element EL may be, but not be limited to, an organic light emitting diode (OLED). In other examples, the light emitting element EL may be a nano light emitting diode (NED), a quantum dot (QD) light emitting diode, a micro light emitting diode, an inorganic light emitting diode, or any other suitable light emitting element. The light emitting element EL may have a parasitic capacitor CEL formed between the anode of the light emitting element EL and a line of a second power supply voltage ELVSS (e.g., a low power supply voltage). The parasitic capacitor CEL may be initialized or discharged by the anode initialization operation. In some embodiments, the light emitting element EL include the anode coupled to the sixth and seventh transistors T6 and T7, and a cathode coupled to the line of the second power supply voltage ELVSS.

A frame period for the pixel 1200 (or a display panel including the pixel 1200) according to embodiments may include one scan period and/or one or more hold periods. Here, the scan period may be a period in which the data voltage VDAT is provided to the pixel 120, and the hold period may be a period in which the pixel 120 maintains the data voltage VDAT.

As illustrated in FIG. 21, the scan period SP may include a gate initialization period GIP in which the pixel 1200 performs a gate initialization operation, a threshold voltage compensation period VCP in which the pixel 1200 performs a threshold voltage compensation operation, a data writing period DWP in which the pixel 1200 performs a data writing operation, an anode initialization period AIP in which the pixel 1200 performs the anode initialization operation, and an emission period EMP in which the pixel 1200 performs an emission operation. The gate initialization period GIP, the threshold voltage compensation period VCP, the data writing period DWP and the anode initialization period AIP may be located within a non-emission period in which the emission signal EM has an off level (e.g., a high level). In some embodiments, the anode initialization period AIP may overlap the gate initialization period GIP.

In the gate initialization period GIP, the gate initialization signal GI may have an on level (e.g., a low level), and the fourth transistor T4 may be turned on in response to the gate initialization signal GI having the on level. Thus, the fourth transistor T4 may apply the gate initialization voltage VGINT to the second node N2, or the gate of the first transistor T1, and thus may perform the gate initialization operation that initializes the gate of the first transistor T1. In some embodiments, a time length of the gate initialization period GIP may correspond to, but not limited to, three horizontal times (or a 3H time). Here, one horizontal time (or a 1H time) may be a time allocated for one pixel row of a display panel.

In the threshold voltage compensation period VCP, the compensation signal GC may have the on level, and the third and fifth transistors T3 and T5 may be turned on in response to the compensation signal GC having the on level. Thus, the fifth transistor T5 may apply the reference voltage VREF to the first node N1, or the first electrode of the second capacitor C2. In some embodiments, the reference voltage VREF may have a voltage level substantially the same as a voltage level of the first power supply voltage ELVDD, but the voltage level of the reference voltage VREF is not limited thereto. Further, the third transistor T3 may diode-connect the first transistor T1. Accordingly, a voltage where a threshold voltage of the first transistor T1 is subtracted from the first power supply voltage ELVDD may be applied through the diode-connected first transistor T1 to the second node N2, or the second electrode of the second capacitor C2. Thus, the threshold voltage compensation operation may be performed in the threshold voltage compensation period VCP. In some embodiments, a time length of the threshold voltage compensation period VCP may correspond to, but not limited to, three horizontal times (or a 3H time). Further, in some embodiments, the threshold voltage compensation period VCP may be spaced apart from the data writing period DWP by one horizontal time (or a 1H time), and the threshold voltage compensation period VCP may have the time length, for example the three horizontal times longer than a time length (e.g., corresponding to the 1H time) of the data writing period DWP. Thus, since the threshold voltage compensation period VCP has the time length longer than that of the data writing period DWP, the threshold voltage of the first transistor T1 may be sufficiently compensated.

In the data writing period DWP, the writing signal GW may have the on level, and the second transistor T2 may be turned on in response to the writing signal GW having the on level. Thus, the second transistor T2 may apply the data voltage VDAT to the first node N1, or the first electrode of the second capacitor C2. Accordingly, a voltage of the first electrode of the second capacitor C2 may be changed from the reference voltage VREF to the data voltage VDAT by a difference between the data voltage VDAT and the reference voltage VREF. If the voltage of the first electrode of the second capacitor C2 is changed by the difference between the data voltage VDAT and the reference voltage VREF, a voltage of the second electrode of the second capacitor C2 in a floating state also may be changed by the difference between the data voltage VDAT and the reference voltage VREF. Accordingly, in the data writing period DWP, the voltage of the second electrode of the second capacitor C2, or a voltage of the second node N2 may become a voltage (e.g., "ELVDD−VTH+VDAT−VREF") where the difference between the data voltage VDAT and the reference voltage VREF is added to the voltage where the threshold voltage is subtracted from the first power supply voltage ELVDD. In some embodiments, a time length of the data writing period DWP may correspond to, but not limited to, one horizontal time (or a 1H time).

In the anode initialization period AIP, the anode initialization signal GB may have the on level, and the seventh transistor T7 may be turned on in response to the anode initialization signal GB having the on level. Thus, the seventh transistor T7 may apply the anode initialization voltage VAINT to the anode of the light emitting element EL, and thus the parasitic capacitor CEL of the light emitting element EL may be initialized or discharged. In some embodiments, a time length of the anode initialization period AIP may correspond to, but not limited to, one horizontal time (or a 1H time).

Further, in some embodiments, the data writing period DWP is spaced apart from the emission period EMP by one horizontal time (or a 1H time). In the emission period EMP, the emission signal EM may have the on level, and the sixth transistor T6 may be turned on in response to the emission signal EM having the on level. Thus, the first transistor T1 may generate the driving current based on the voltage of the second node N2, or the voltage of the second electrode of the second capacitor C2, the sixth transistor T6 may provide the driving current generated by the first transistor T1 to the light emitting element EL, and the light emitting element EL may emit light based on the driving current.

As illustrated in FIG. 22, the hold period HP may include only the anode initialization period AIP in which the pixel 1200 performs the anode initialization operation, and the emission period EMP in which the pixel 1200 performs the emission operation. Accordingly, in the hold period HP, the pixel 1200 may maintain the data voltage VDAT that is stored in the data writing period DWP of the scan period SP, and the parasitic capacitor CEL of the light emitting element EL may be initialized or discharged. In some embodiments, the number or a time length of the anode initialization period AIP included in each hold period HP may gradually increase as the hold periods HP continue.

In the pixel 1200 according to embodiments, the discharging degree of the parasitic capacitor CEL of the light emitting element EL by the anode initialization operation may gradually increase in the one or more hold periods HP. In some embodiments, to gradually increase the discharging degree of the parasitic capacitor CEL in the hold periods HP, the number of applying the anode initialization signal GB to the pixel 1200 may gradually increase. In other embodiments, to gradually increase the discharging degree of the parasitic capacitor CEL in the hold periods HP, a width of the anode initialization signal GB may gradually increase in the hold periods HP. In still other embodiments, to gradually increase the discharging degree of the parasitic capacitor CEL in the hold periods HP, the anode initialization voltage VAINT may be gradually decreased in the hold periods HP. Accordingly, a luminance increase in the hold period HP may be prevented or reduced, and a luminance difference between different driving frequencies may be prevented or reduced.

Figure 23:
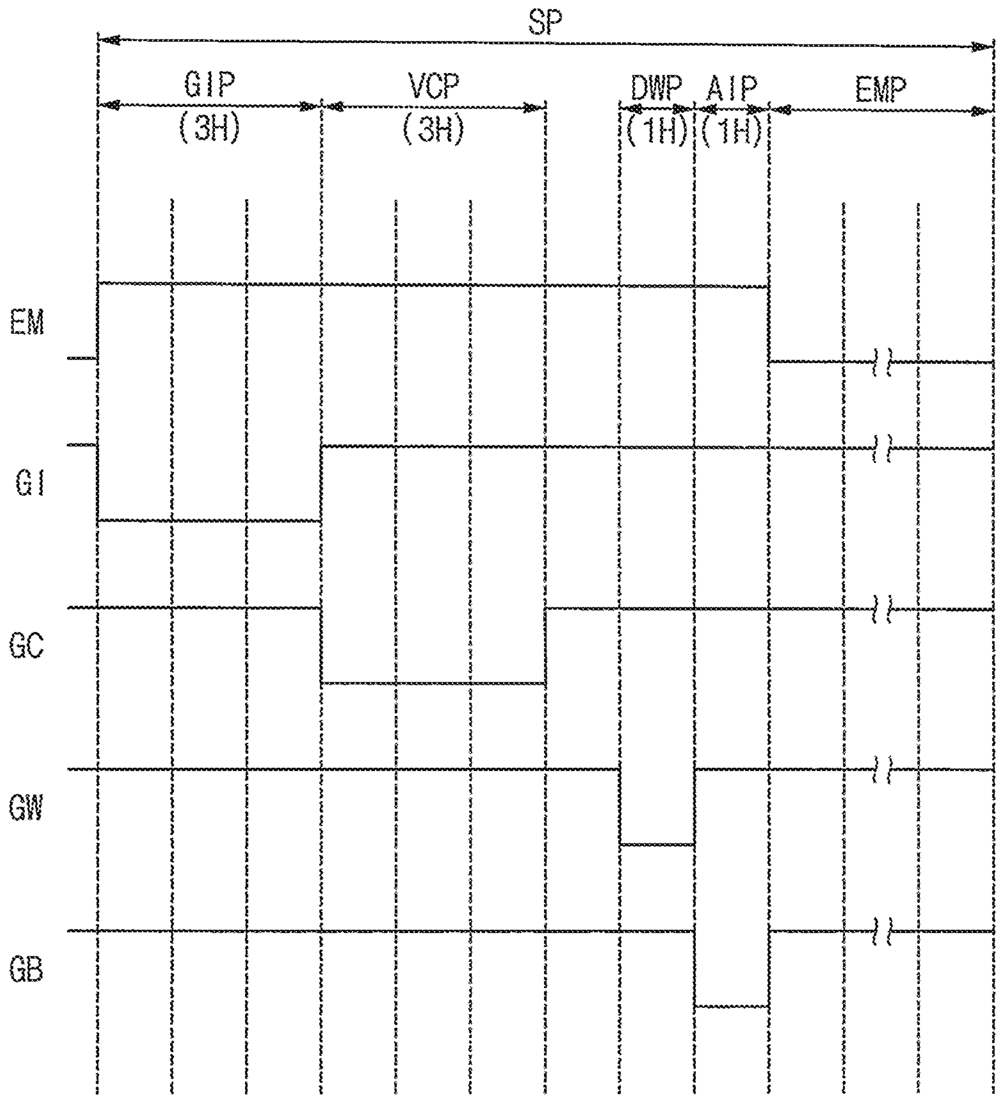
FIG. 23 is a timing diagram for describing another example of an operation of a pixel of FIG. 20 in a scan period.

FIG. 23 is a timing diagram for describing another example of an operation of a pixel of FIG. 20 in a scan period.

Referring to FIG. 23, a scan period SP may include a gate initialization period GIP, a threshold voltage compensation period VCP, a data writing period DWP, an anode initialization period AIP, and an emission period EMP. In the scan period SP illustrated in FIG. 23, unlike in a scan period SP illustrated in FIG. 21, the anode initialization period AIP may not overlap the gate initialization period GIP. In some embodiments, as illustrated in FIG. 23, the anode initialization period AIP may be located after the data writing period DWP and before the emission period EMP. In other embodiments, the anode initialization period AIP may be located between the threshold voltage compensation period VCP and the data writing period DWP. In some embodiments, a time length of the anode initialization period AIP may correspond to, but not limited to, one horizontal time (or a 1H time).

Figure 24:
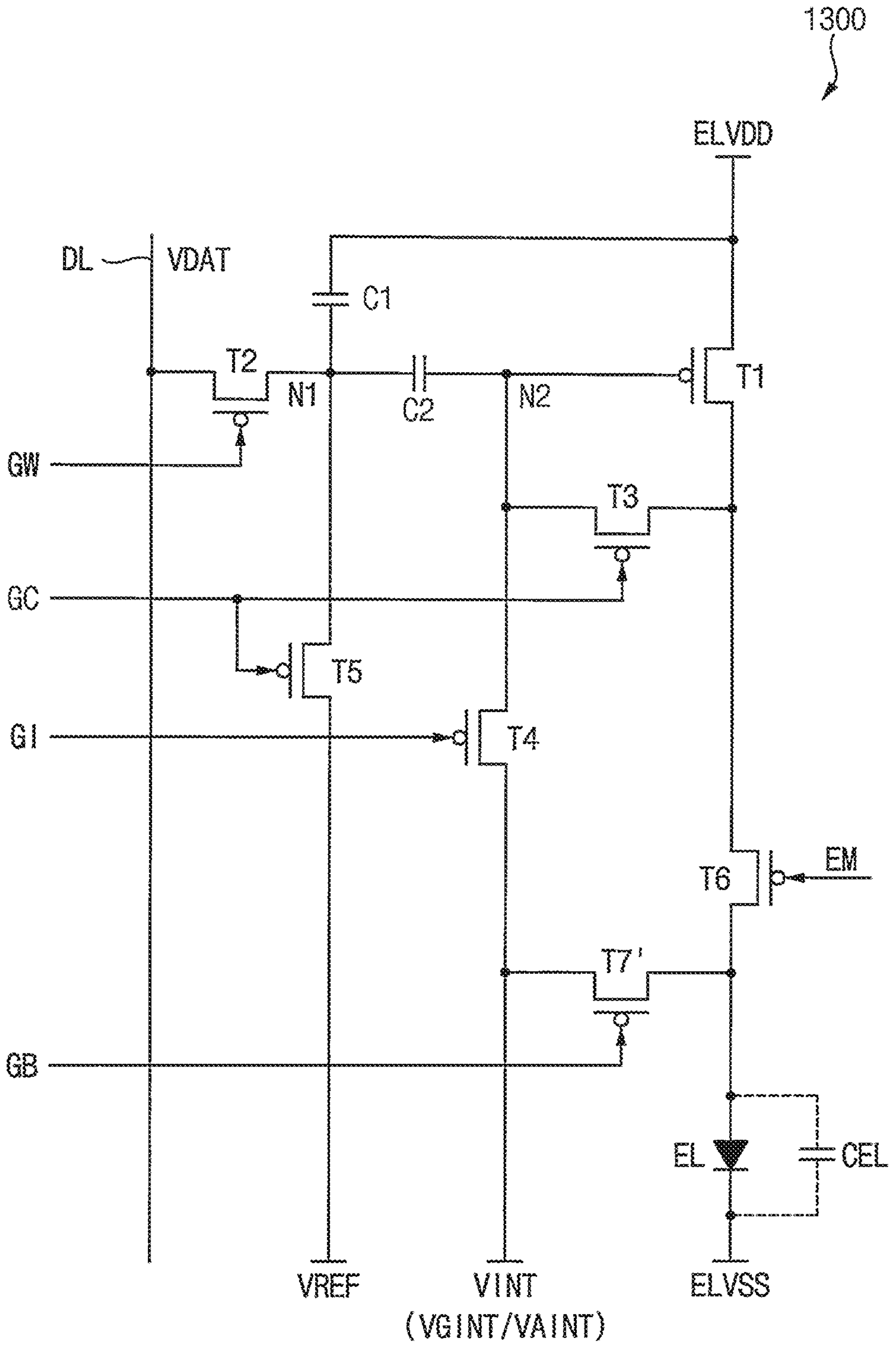
FIG. 24 is a circuit diagram illustrating a pixel according to embodiments.

FIG. 24 is a circuit diagram illustrating a pixel according to embodiments.

Referring to FIG. 24, a pixel 1300 according to embodiments may include a first capacitor C1, a second capacitor C2, a first transistor T1, a second transistor T2, a third transistor T3, a fourth transistor T4, a fifth transistor T5, a sixth transistor T6, a seventh transistor T7', and a light emitting element EL. The pixel 1300 of FIG. 24 may have a similar configuration and a similar operation to a pixel 1200 of FIG. 20, except that the pixel 1300 may receive a gate initialization voltage VGINT and an anode initialization voltage VAINT through the same line. The gate initialization voltage VGINT and the anode initialization voltage VAINT may be the same initialization voltage VINT provide to the pixel 1300 through the same line.

Figure 25:
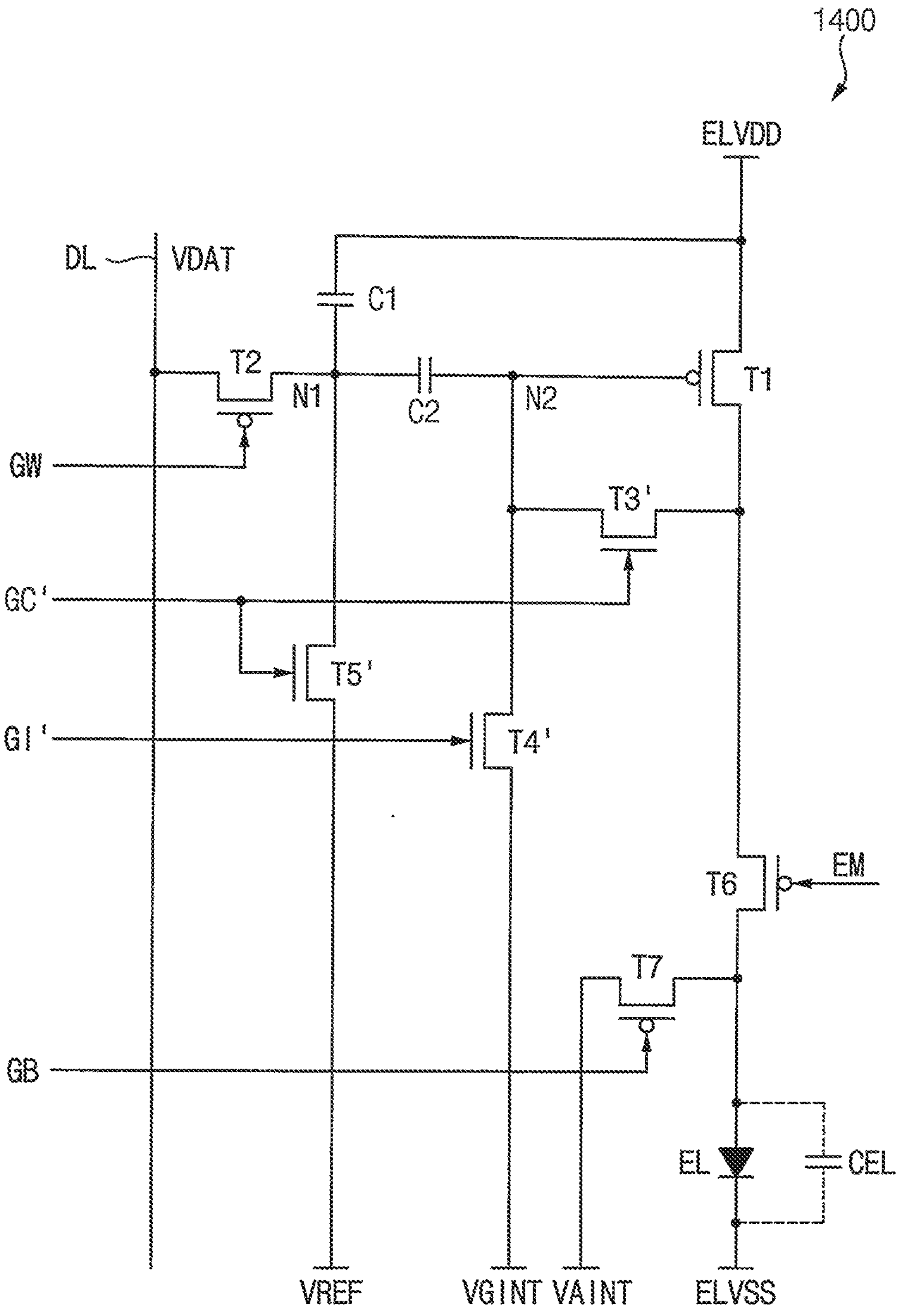
FIG. 25 is a circuit diagram illustrating a pixel according to embodiments.
Figure 26:
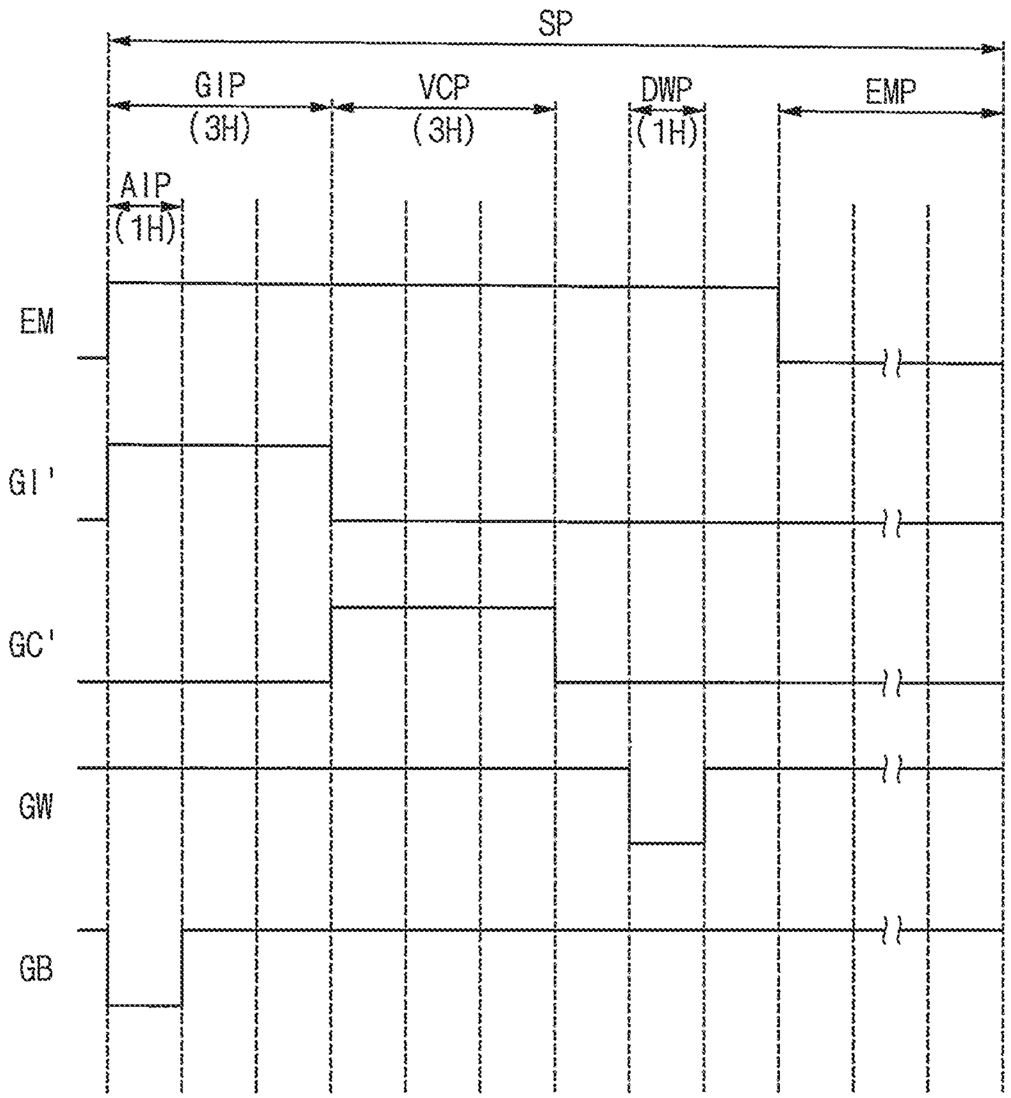
FIG. 26 is a timing diagram for describing an example of an operation of a pixel of FIG. 25 in a scan period.

FIG. 25 is a circuit diagram illustrating a pixel according to embodiments, and FIG. 26 is a timing diagram for describing an example of an operation of a pixel of FIG. 25 in a scan period.

Referring to FIG. 25, a pixel 1400 according to embodiments may include a first capacitor C1, a second capacitor C2, a first transistor T1, a second transistor T2, a third transistor T3', a fourth transistor T4', a fifth transistor T5', a sixth transistor T6, a seventh transistor T7, and a light emitting element EL. The pixel 1400 of FIG. 25 may have a similar configuration and a similar operation to a pixel 1200 of FIG. 20, except that the third, fourth and fifth transistors T3', T4', and T5' are implemented with n-type metal oxide semiconductor (NMOS) transistors.

A portion (e.g., the first, second, sixth and seventh transistors T1, T2, T6, and T7) of transistors of the pixel 1400 may be implemented with PMOS transistors, and the remaining transistors (e.g., the third, fourth and fifth transistors T3', T4', and T5') may be implemented with the NMOS transistors. In this case, a leakage current of the pixel 1400 may be reduced. In some embodiments, as illustrated in FIG. 25, the third, fourth and fifth transistors T3', T4', and T5' are implemented with the NMOS transistors. In this case, as illustrated in FIG. 26, a gate initialization signal GI' and a compensation signal GC' applied to the third, fourth and fifth transistors T3', T4', and T5' may be active high signals having a high level as an on level.

Figure 27:
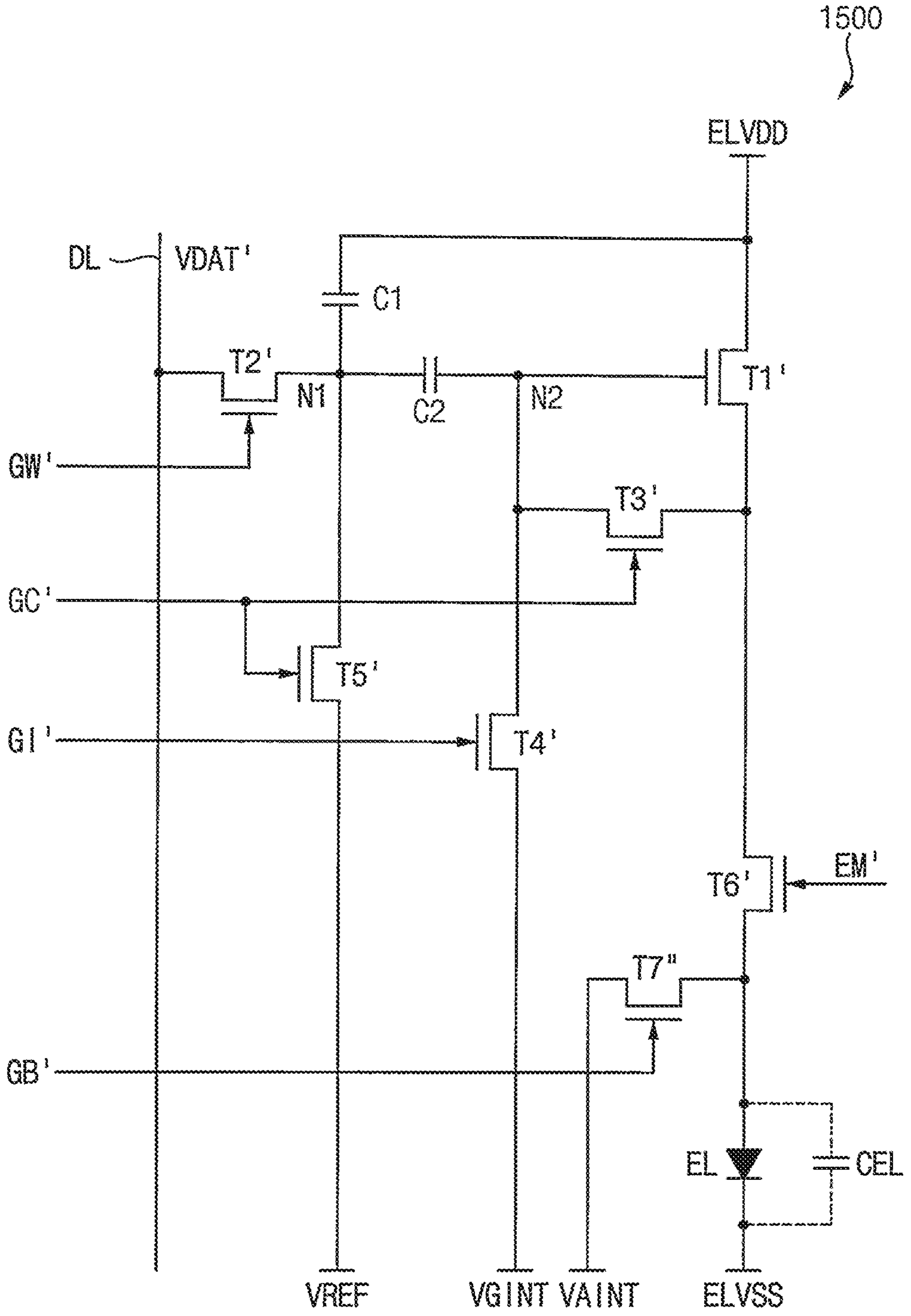
FIG. 27 is a circuit diagram illustrating a pixel according to embodiments.
Figure 28:
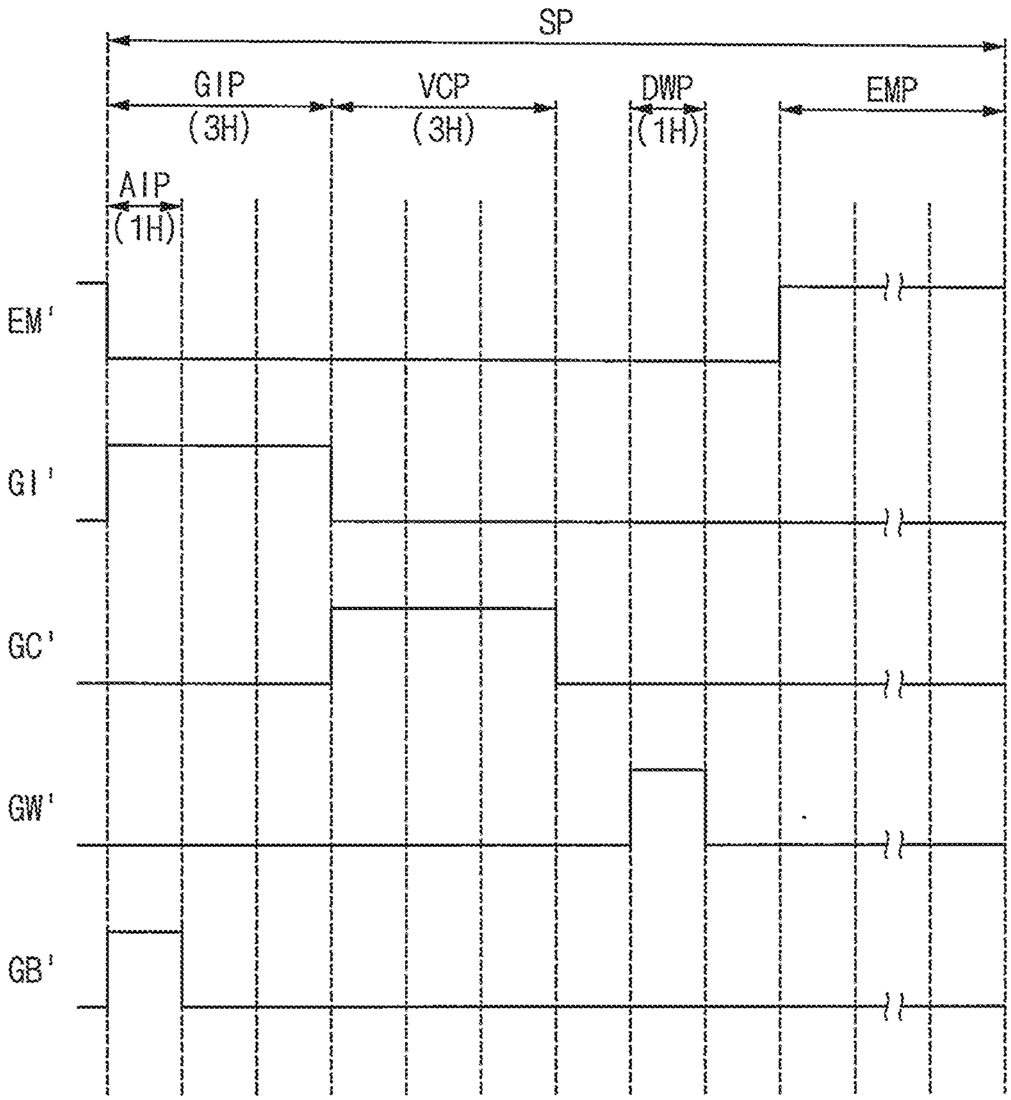
FIG. 28 is a timing diagram for describing an example of an operation of a pixel of FIG. 27 in a scan period.

FIG. 27 is a circuit diagram illustrating a pixel according to embodiments, and FIG. 28 is a timing diagram for describing an example of an operation of a pixel of FIG. 27 in a scan period.

Figure 29:
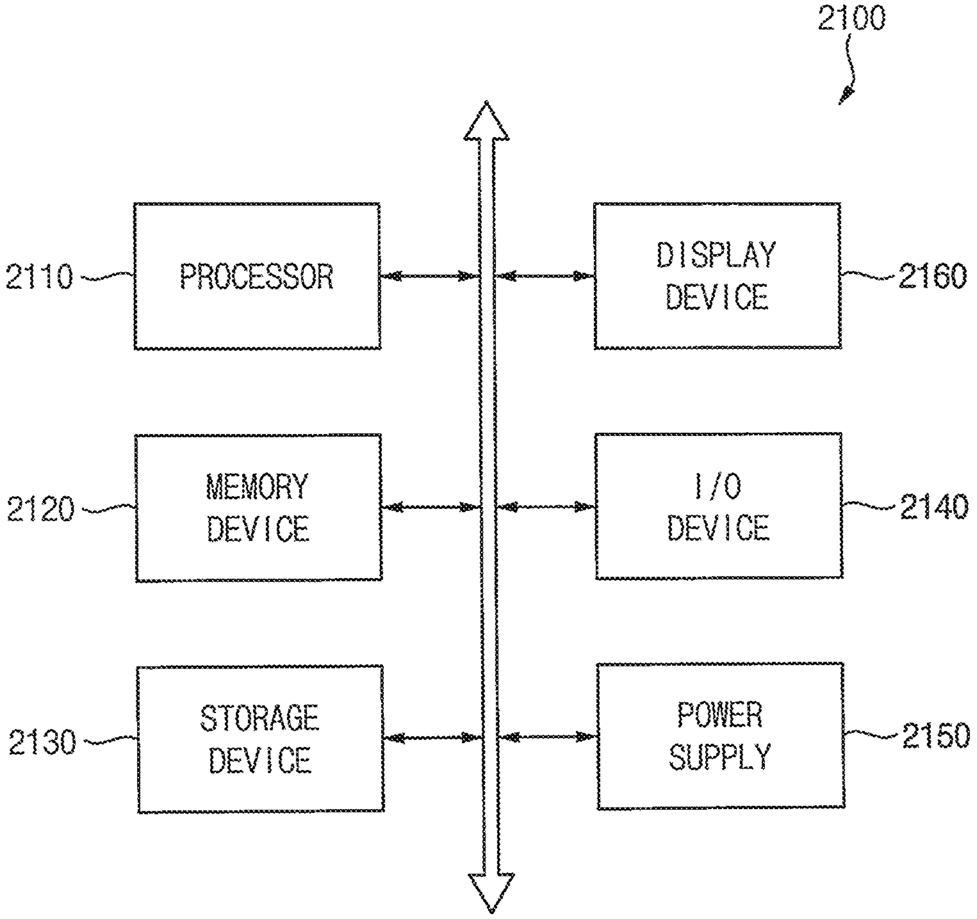
FIG. 29 is an electronic device including a display device according to embodiments.

Referring to FIG. 27, a pixel 1500 according to embodiments may include a first capacitor C1, a second capacitor C2, a first transistor T1', a second transistor T2', a third transistor T3', a fourth transistor T4', a fifth transistor T5', a sixth transistor T6', a seventh transistor T7", and a light emitting element EL. The pixel 1500 of FIG. 27 may have a similar configuration and a similar operation to a pixel 1200 of FIG. 20, except that all transistors T1' through T7" are implemented with NMOS transistors. In this case, a data voltage VDAT' applied to the pixel 1500 may have a voltage level suitable for the first transistor T1' implemented with the NMOS transistor. Further, as illustrated in FIG. 28, signals EM', GI', GC', GW', and GB' may be active high signals having a high level as an on level. FIG. 29 is an electronic device including a display device according to embodiments.

Referring to FIG. 29, an electronic device 2100 may include a processor 2110, a memory device 2120, a storage device 2130, an input/output (I/O) device 2140, a power supply 2150, and a display device 2160. The electronic device 2100 may further include a plurality of ports for communicating with a video card, a sound card, a memory card, a universal serial bus (USB) device, other electric devices, etc.

The processor 2110 may perform various computing functions or tasks. The processor 2110 may be an application processor (AP), a micro processor, a central processing unit (CPU), and etc. The processor 2110 may be coupled to other components via an address bus, a control bus, a data bus, and etc. Further, in some embodiments, the processor 2110 may be further coupled to an extended bus such as a peripheral component interconnection (PCI) bus.

The memory device 2120 may store data for operations of the electronic device 2100. For example, the memory device 2120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, and etc.

The storage device 2130 may be a solid state drive (SSD) device, a hard disk drive (HDD) device, a CD-ROM device, and etc. The I/O device 2140 may be an input device such as a keyboard, a keypad, a mouse, a touch screen, etc, and an output device such as a printer, a speaker, etc. The power supply 2150 may supply power for operations of the electronic device 2100. The display device 2160 may be coupled to other components through the buses or other communication links.

In the display device 2160, a time during which each pixel performs an anode initialization operation in a hold period may be longer than a time during which each pixel performs the anode initialization operation in a scan period. Alternatively, in the display device 2160, a voltage level of an anode initialization voltage in the hold period may be different from a voltage level of the anode initialization voltage in the scan period. Accordingly, a luminance increase in the hold period may be prevented or reduced, and a luminance difference between different driving frequencies may be prevented or reduced.

The inventive concepts may be applied to any display device 2160, and any electronic device 2100 including the display device 2160. For example, the inventive concepts may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, and etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel of a display device, the pixel comprising:

a light emitting element including an anode; and a transistor configured to apply an anode initialization voltage to the anode of the light emitting element in response to an anode initialization signal, wherein a period in which the pixel is driven at a first driving frequency includes a first scan period, and a second scan period subsequent to the first scan period, wherein a period in which the pixel is driven at a second driving frequency lower than the first driving frequency includes a third scan period, and a first hold period subsequent to the third scan period, wherein the first scan period, the second scan period, the third scan period and the first hold period have a same time length, and wherein an on-period of the anode initialization signal in the first hold period is longer than an on-period of the anode initialization signal in the third scan period.

2. The pixel of claim 1, wherein a number of the anode initialization signal applied to the transistor in the first hold period is greater than a number of the anode initialization signal applied to the transistor in the third scan period.

3. The pixel of claim 2, wherein a number of the anode initialization signal applied to the transistor in the first scan period is equal to the number of the anode initialization signal applied to the transistor in the third scan period.

4. The pixel of claim 3, wherein the number of the anode initialization signal applied to the transistor in the first hold period is greater than the number of the anode initialization signal applied to the transistor in the first scan period.

5. The pixel of claim 4, wherein the number of the anode initialization signal applied to the transistor in the first hold period is greater than a number of the anode initialization signal applied to the transistor in the second scan period.

6. The pixel of claim 5, wherein each anode initialization signal applied to the transistor in the first scan period, the second scan period, the third scan period and the first hold period has a same width.

7. The pixel of claim 6, further comprising:

a second capacitor including a first electrode and a second electrode;

a first transistor including a gate coupled to the second electrode of the second capacitor;

a second transistor configured to transfer a data voltage to the first electrode of the second capacitor in response to a writing signal; and a sixth transistor configured to couple the first transistor and the light emitting element in response to an emission signal.

8. The pixel of claim 7, wherein, in each of the first, second and third scan periods, the writing signal and the anode initialization signal are applied while the sixth transistor is turned off, and wherein, in the first hold period, the anode initialization signal is applied while the sixth transistor is turned off.

9. The pixel of claim 8, further comprising:

a fourth transistor configured to apply a gate initialization voltage to the second electrode of the second capacitor in response to a gate initialization signal.

10. The pixel of claim 9, wherein, in each of the first, second and third scan periods, the gate initialization signal is applied to the fourth transistor, and wherein, in the first hold period, the gate initialization signal is not applied to the fourth transistor.

11. The pixel of claim 10, wherein, in each of the first, second and third scan periods, the gate initialization signal and the writing signal are sequentially applied while the emission signal has an off-level, and wherein, in the first hold period, the gate initialization signal and the writing signal are not applied.

12. The pixel of claim 11, wherein the period in which the pixel is driven at the second driving frequency further includes a second hold period subsequent to the first hold period.

13. The pixel of claim 12, wherein an on-period of the anode initialization signal in the second hold period is longer than the on-period of the anode initialization signal in the first hold period.

14. The pixel of claim 13, wherein a number of the anode initialization signal applied to the transistor in the second hold period is greater than the number of the anode initialization signal applied to the transistor in the first hold period.

15. The pixel of claim 1, wherein the first driving frequency is about 240 Hz, and the second driving frequency is about 60 Hz.

* * * * *